US012792176B2

(12) United States Patent
Zeng et al.

(10) Patent No.: US 12,792,176 B2
(45) Date of Patent: *Nov. 10, 2026

(54) TOUCH SUBSTRATE, TOUCH PANEL AND TOUCH DISPLAY DEVICE

(71) Applicants: Chongqing BOE Display Technology Co., Ltd., Chongqing (CN); BOE TECHNOLOGY GROUP CO., LTD., Beijing (CN)

(72) Inventors: Chao Zeng, Beijing (CN); Shouqiang Zhang, Beijing (CN); Rui Wang, Beijing (CN); Weishu Wen, Beijing (CN); Xinghua Cui, Beijing (CN); Yifan Liu, Beijing (CN)

(73) Assignees: CHONGQING BOE DISPLAY TECHNOLOGY CO. , LTD., Chongqing (CN); BOE TECHNOLOGY GROUP CO. , LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/095,675

(22) Filed: Mar. 31, 2025

(65) Prior Publication Data

US 2025/0224831 A1 Jul. 10, 2025

Related U.S. Application Data

(63) Continuation of application No. 18/262,091, filed as application No. PCT/CN2022/093340 on May 17, 2022, now Pat. No. 12,293,035.

(51) Int. Cl.
*G06F 3/041* (2006.01)

(52) U.S. Cl.
CPC ................................ *G06F 3/04164* (2019.05)

(58) Field of Classification Search
None
See application file for complete search history.

(56) References Cited

U.S. PATENT DOCUMENTS

2018/0040678 A1* 2/2018 Zhai ........................ G01L 1/205
2020/0333916 A1* 10/2020 Zhang .................. G06F 3/0443
(Continued)

FOREIGN PATENT DOCUMENTS

CN 106707646 A 5/2017
CN 206193731 U 5/2017
(Continued)

OTHER PUBLICATIONS

The First Office Action mailed Apr. 29, 2026, in Chinese Application No. 202280001258.6, 19 pages including English translation.

*Primary Examiner* — Parul H Gupta
(74) *Attorney, Agent, or Firm* — XSENSUS LLP

(57) ABSTRACT

A touch substrate includes a first layer wiring group and a second layer wiring group that are located in a peripheral region. The first layer wiring group includes a plurality of first wirings, the second layer wiring group includes a plurality of second wirings, and a square resistance of a first wiring is greater than a square resistance of a second wiring. The peripheral region includes a first wiring region provided with at least one first-type touch lead therein and a second wiring region provided with at least one second-type touch lead therein. Each first-type touch lead includes a first wiring and a second wiring that are connected to each other and whose orthographic projections on the touch substrate are overlapped. Any second-type touch lead includes a second wiring or a first wiring. A length of the first-type touch lead is greater than a length of the second-type touch lead.

20 Claims, 11 Drawing Sheets

(56) References Cited

U.S. PATENT DOCUMENTS

| | | | | |
|---|---|---|---|---|
| 2024/0153968 | A1* | 5/2024 | Jia | H10D 84/01 |
| 2024/0206271 | A1* | 6/2024 | Zhang | H10K 59/1201 |
| 2024/0361874 | A1* | 10/2024 | Zhang | G06F 3/04164 |

FOREIGN PATENT DOCUMENTS

| | | | |
|---|---|---|---|
| CN | 107783698 | A | 3/2018 |
| CN | 114420726 | A | 4/2022 |
| KR | 20150106085 | A | 9/2015 |

* cited by examiner

TOUCH SUBSTRATE, TOUCH PANEL AND TOUCH DISPLAY DEVICE

CROSS-REFERENCE TO RELATED APPLICATIONS

This application is a continuation of U.S. Ser. No. 18/262,091, filed on Jul. 19, 2023, which claims priority to International Patent Application No. PCT/CN2022/093340, filed on May 17, 2022, each are incorporated herein by reference in their entirety.

TECHNICAL FIELD

The present disclosure relates to the field of touch display technologies, and in particular, to a touch substrate, a touch panel and a touch display device.

BACKGROUND

With the rapid development of touch technologies, touch substrates are more and more widely used. The touch substrate tends to have a narrow bezel based on market demands. Specifically, the touch substrate includes touch electrodes and touch leads for providing signals to the touch electrodes. The touch leads are distributed around the touch substrate.

SUMMARY

In an aspect, a touch substrate is provided. The touch substrate has a touch region and a peripheral region located on at least one side of the touch region. The touch substrate includes a first layer wiring group and a second layer wiring group that are located in the peripheral region. The first layer wiring group includes a plurality of first wirings, the second layer wiring group includes a plurality of second wirings, and a square resistance of a first wiring is greater than a square resistance of a second wiring.

The peripheral region includes a first wiring region and a second wiring region, and at least a portion of the first wiring region is farther from the touch region than the second wiring region. The first wiring region is provided with at least one first-type touch lead therein, each first-type touch lead includes a first wiring in the plurality of first wirings and a second wiring in the plurality of second wirings that are connected to each other, and orthographic projections of the first wiring and the second wiring of the first-type touch lead on the touch substrate are overlapped. The second wiring region is provided with at least one second-type touch lead therein, and each second-type touch lead includes a second wiring in the plurality of second wirings or a first wiring in the plurality of first wirings. A length of the first-type touch lead is greater than a length of the second-type touch lead.

In some embodiments, a resistance of the first-type touch lead is substantially equal to a resistance of the second-type touch lead.

In some embodiments, the second wiring region includes a first wiring sub-region and a second wiring sub-region. A second-type touch lead in the at least one second-type touch lead disposed in the first wiring sub-region includes a second wiring in the plurality of second wirings, and a second-type touch lead in the at least one second-type touch lead disposed in the second wiring sub-region includes a first wiring in the plurality of first wirings. At least a portion of the first wiring sub-region is farther from the touch region than the second wiring sub-region. A length of the second-type touch lead in the first wiring sub-region is greater than a length of the second-type touch lead in the second wiring sub-region.

In some embodiments, the peripheral region further includes a third wiring region. At least a portion of the third wiring region is closer to the touch region than the first wiring sub-region, and is farther from the touch region than the second wiring sub-region. The third wiring region is provided with at least one third-type touch lead therein, and each third-type touch lead includes a first segment and a second segment connected to each other in an extending direction of the third-type touch lead. The first segment includes a first wiring in the plurality of first wirings, and the second segment includes a second wiring in the plurality of second wirings. A length of the third-type touch lead is greater than the length of the second-type touch lead in the second wiring sub-region, and is less than the length of the second-type touch lead in the first wiring sub-region.

In some embodiments, a resistance of the third-type touch lead is substantially equal to a resistance of the first-type touch lead, and is substantially equal to a resistance of the second-type touch lead.

In some embodiments, each type of touch leads includes a plurality of touch leads arranged in a direction from the peripheral region to the touch region, and lengths of the plurality of touch leads are reduced in the direction from the peripheral region to the touch region. Each type of touch leads includes any one of first-type touch leads included in the at least one first-type touch lead, second-type touch leads included in the at least one second-type touch lead, and third-type touch leads included in the at least one third-type touch lead.

In some embodiments, the peripheral region located on the at least one side of the touch region is provided with a bonding region, and the at least one first-type touch lead, the at least one second-type touch lead and the at least one third-type touch lead are gathered to the bonding region.

In some embodiments, a distance between every two adjacent touch leads in the plurality of touch leads of each type of touch leads is in a range of 3 μm to 5 μm, inclusive.

In some embodiments, the peripheral region is located on three sides of the touch region, and is divided into a first side peripheral region, a second side peripheral region and a third side peripheral region; the first wiring region includes a first region, a second region and a third region connected in sequence. The first region is located in the first side peripheral region, the second region is located in the second side peripheral region, and the third region is located in the third side peripheral region. The first-type touch lead includes a first extending segment, a second extending segment and a third extending segment connected in sequence. The first extending segment is located in the first region, the second extending segment is located in the second region, and the third extending segment is located in the third region. A wiring width of the first extending segment is greater than a wiring width of the second extending segment, and the wiring width of the second extending segment is greater than a wiring width of the third extending segment.

In some embodiments, the at least one first-type touch lead includes a plurality of first-type touch leads. In the second region, wiring widths of second extending segments of the plurality of first-type touch leads are reduced in a direction from the second region to the touch region.

In some embodiments, the bonding region is located in the third side peripheral region.

In some embodiments, at least one side of each wiring region in an extending direction of a touch lead in the wiring region is provided with a shielding region. The shielding region includes at least one shielding line and at least one grounding line. Each shielding line includes a first wiring in the plurality of first wirings and a second wiring in the plurality of second wirings that are connected to each other, and orthographic projections of the first wiring and the second wiring of the shielding line on the touch substrate are overlapped. Each grounding line includes a first wiring in the plurality of first wirings and a second wiring in the plurality of second wirings that are connected to each other, and orthographic projections of the first wiring and the second wiring of the grounding line on the touch substrate are overlapped. Each wiring region includes any one of the first wiring region, the first wiring sub-region, the third wiring region and the second wiring sub-region.

In some embodiments, the touch substrate further includes a substrate, a first insulating layer and a second insulating layer. The first layer wiring group is disposed on a side of the substrate. The first insulating layer is disposed on a side of the first layer wiring group away from the substrate. The second layer wiring group is disposed on a side of the first insulating layer away from the substrate. The second insulating layer is disposed on a side of the second layer wiring group away from the substrate.

In some embodiments, the peripheral region located on the at least one side of the touch region is provided with a bonding region. The touch substrate further includes a plurality of first electrode lines extending in a first direction and a plurality of second electrode lines extending in a second direction that are all located in the touch region. The first direction and the second direction intersect. The touch substrate further includes at least one flexible printed circuit. The at least one flexible printed circuit each have an end disposed in the bonding region. An end of a touch lead is connected to an end of a first electrode line or a second electrode line, and another end of the touch lead is connected to a flexible printed circuit. The touch lead is the first-type touch lead or the second-type touch lead.

In some embodiments, two ends of the first electrode line are each connected to a touch lead, and two ends of the second electrode line are each connected to a touch lead.

In another aspect, a touch panel is provided. The touch panel includes the above touch substrate, and further includes a display panel stacked on the touch substrate.

In yet another aspect, a touch display device is provided. The touch display device includes the above touch panel.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method, and an actual timing of a signal involved in the embodiments of the present disclosure.

DETAILED DESCRIPTION

Figure 1:
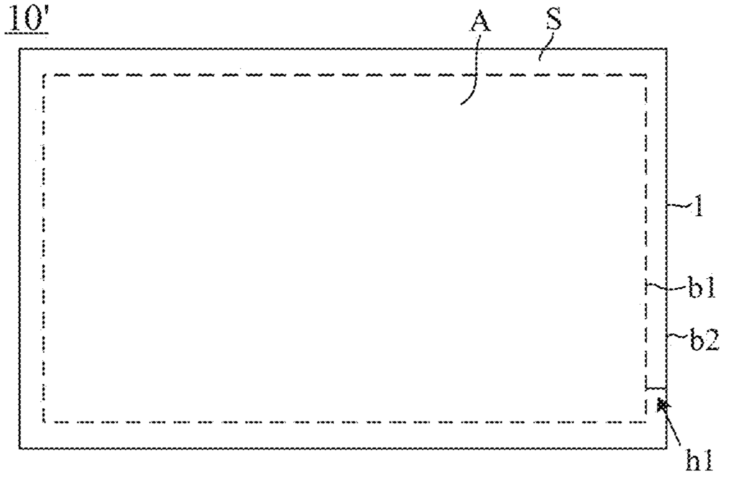
FIG. 1 is a structural diagram of a display device.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term “comprise” and other forms thereof such as the third-person singular form “comprises” and the present participle form “comprising” are construed as an open and inclusive meaning, i.e., “including, but not limited to.” In the description of the specification, the terms such as “one embodiment,” “some embodiments,” “exemplary embodiments,” “an example,” “specific example” or “some examples” are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as “first” and “second” are only used for descriptive purposes, and are not to be construed as indicating or implying relative importance or implicitly indicating the number of indicated technical features. Thus, a feature defined with “first” or “second” may explicitly or implicitly include one or more of the features. In the description of the embodiments of the present disclosure, the term “a plurality of/the plurality of” means two or more unless otherwise specified.

In the description of some embodiments, the terms such as “coupled” and “connected” and extensions thereof may be used. For example, the term “connected” may be used in the description of some embodiments to indicate that two or more components are in direct physical or electrical contact with each other. For another example, the term “coupled” may be used in the description of some embodiments to indicate that two or more components are in direct physical or electrical contact. However, the term “coupled” or “communicatively coupled” may also mean that two or more components are not in direct contact with each other, but still cooperate or interact with each other. The embodiments disclosed herein are not necessarily limited to the contents herein.

The phrase “at least one of A, B and C” has the same meaning as the phrase “at least one of A, B or C”, both including following combinations of A, B and C: only A, only B, only C, a combination of A and B, a combination of A and C, a combination of B and C, and a combination of A, B and C.

The phrase “A and/or B” includes following three combinations: only A, only B, and a combination of A and B.

As used herein, the term “if” is, optionally, construed to mean “when” or “in a case where” or “in response to determining” or “in response to detecting”, depending on the context. Similarly, the phrase “if it is determined” or “if [a stated condition or event] is detected” is, optionally, construed to mean “in a case where it is determined” or “in response to determining” or “in a case where [the stated condition or event] is detected” or “in response to detecting [the stated condition or event]”, depending on the context.

The use of the phrase “applicable to” or “configured to” herein means an open and inclusive expression, which does not exclude devices that are applicable to or configured to perform additional tasks or steps.

In addition, the use of the phase “based on” means openness and inclusiveness, since a process, step, calculation or other action that is “based on” one or more stated conditions or values may, in practice, be based on additional conditions or values exceeding those stated.

As used herein, the term such as “about,” “substantially” or “approximately” includes a stated value and an average value within an acceptable range of deviation of a particular value. The acceptable range of deviation is determined by a person of ordinary skill in the art, considering measurement in question and errors associated with measurement of a particular quantity (i.e., limitations of a measurement system).

As used herein, the term such as “parallel,” “perpendicular” or “equal” includes a stated condition and condition(s) similar to the stated condition. The similar condition(s) are within an acceptable range of deviation as determined by a person of ordinary skill in the art, considering measurement in question and errors associated with measurement of a particular quantity (i.e., limitations of a measurement system). For example, the term “parallel” includes “absolutely parallel” and “approximately parallel”, and for the phrase “approximately parallel”, an acceptable range of deviation may be, for example, within 5°. The term “perpendicular” includes “absolutely perpendicular” and “approximately perpendicular”, and for the phrase “approximately perpendicular”, an acceptable range of deviation may also be, for example, within 5°. The term “equal” includes “absolutely equal” and “approximately equal”, and for the phrase “approximately equal”, an acceptable range of deviation may be that, for example, a difference between two that are equal to each other is less than or equal to 5% of any one of the two.

It will be understood that when a layer or element is described as being on another layer or substrate, the layer or element may be directly on the another layer or substrate, or intermediate layer(s) may exist between the layer or element and the another layer or substrate.

Exemplary embodiments are described herein with reference to sectional views and/or plan views as idealized exemplary drawings. In the accompanying drawings, thicknesses of layers and sizes of regions are enlarged for clarity. Thus, variations in shape relative to the accompanying drawings due to, for example, manufacturing techniques and/or tolerances may be envisaged. Therefore, the exemplary embodiments should not be construed to be limited to the shapes of regions shown herein, but to include deviations in shape due to, for example, manufacturing. For example, an etched region shown in a rectangular shape generally has a curved feature. Therefore, the regions shown in the accompanying drawings are schematic in nature, and their shapes are not intended to show actual shapes of the regions in a device, and are not intended to limit the scope of the exemplary embodiments.

With the development of science and technology, in a smart device with a touch function, such as a mobile phone, a tablet computer, a digital camera or an intelligent wearable product, human-computer interaction is simplified, which brings high-quality user experience to a user.

In design and manufacturing processes of a product, a screen-to-body ratio of a smart device is improved, so that the product may have a better visual effect. The screen-to-body ratio of the product may be improved by narrowing bezel. As shown in FIG. 1, “narrow bezel” in the prior art means that a distance h1 between an image display edge b1 of a display device 10' and an edge b2 of a substrate 1 is small, so that there is a difference of magnitude between widths of an image touch region A and a bezel region S, e.g., at least 10:1. With the continuous development of science and technology, the difference of magnitude between the widths of the image touch region A and the bezel region S is continuously increased.

Figure 2:
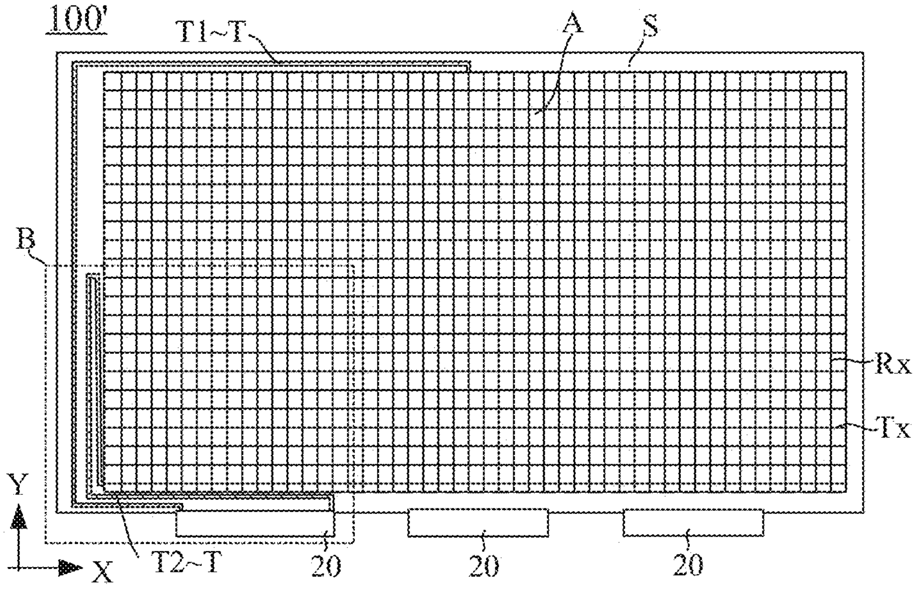
FIG. 2 is a structural diagram of a display panel.

As shown in FIG. 2, a plurality of touch driving lines Tx in a horizontal direction and a plurality of touch sensing lines Rx in a vertical direction are provided in a touch region A of a display panel 100'. Flexible printed circuits (FPCs) 20 connected to a driving integrated circuit (IC) is provided below the display panel 100', so that a signal of the driving IC is transmitted to corresponding touch driving line(s) Tx and corresponding touch sensing line(s) Rx through a plurality of touch leads T.

An end of a touch lead T is connected to a touch sensing line Rx or a touch driving line Tx, and another end of the touch lead T extends towards a direction to be connected to the driving IC. In order to ensure a balance of signals of the touch sensing lines Rx and the touch driving lines Tx, it is a prerequisite for the wiring design that resistances of the touch leads T are substantially equal.

In order to realize an equal resistance design of touch leads T of an existing flexible multi-layer oncell touch structure (flexible multi-layer oncell, FMLOC), a touch lead T with a shorter length needs to be wound in a bezel region S, so that lengths of all the touch leads T are substantially equal, thereby keeping the resistances of the touch leads T equal.

For example, referring to FIG. 2 again, the plurality of touch sensing lines Rx extend in a second direction Y, and two ends of a touch sensing line Rx are respectively, for example, an upper end and a lower end. The plurality of touch driving lines Tx extend in a first direction X, and two ends of a touch driving line Tx are respectively, for example, a left end and a right end. The second direction Y is perpendicular to the first direction X. A touch lead T1 is used for connecting an upper end of one of the touch sensing lines Rx to a conductive contact (not shown in the figure) on an FPC, so as to connect the touch sensing line Rx to the driving IC. A touch lead T2 is used for connecting a left end of one of the touch driving lines Tx to a conductive contact (not shown in the figure) on the FPC, so as to connect the touch driving line Tx to the driving IC. The upper end of the touch sensing line Rx is farther from the driving IC, and the left end of the touch driving line Tx is closer to the driving IC, so that a required length of the touch lead T1 is much greater than a length of the touch lead T2, regardless of whether resistances of the touch lead T1 and the touch lead T2 are equal.

Figure 3:
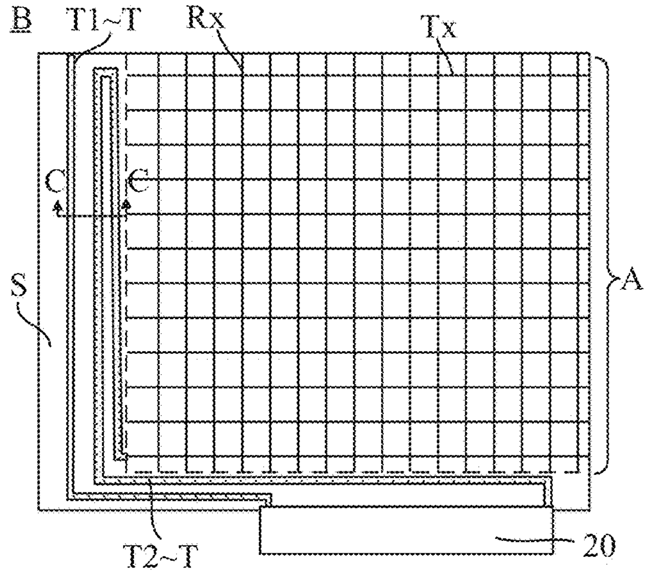
FIG. 3 is an enlarged view at B of the display panel in FIG. 2.

Since the length of the touch lead T1 is greater than the length of the touch lead T2, the resistance of the touch lead T1 is greater than the resistance of the touch lead T2. In order to realize the equal resistance design of the touch lead T2 and the touch lead T1, as shown in FIG. 3, the touch lead T2 needs to be wound in a left side of the bezel region S of the display panel 100', so that the length of the touch lead T2 is increased to be substantially equal to the length of the touch lead T1. Thus, a space of the bezel region occupied by the touch lead T2 is increased, so that a size of the bezel region S is increased, which is not conducive to improving the narrow bezel design of the display panel 100'.

Figure 4:
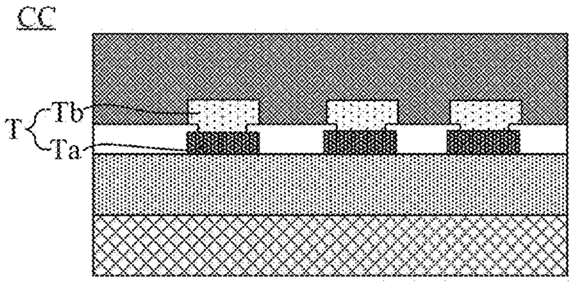
FIG. 4 is a sectional view taken along CC in the enlarged view at B of the display panel in FIG. 3.

Moreover, since a current on the touch lead T of the existing FMLOC is large, in order to reduce the resistance of the touch lead T to reduce a voltage drop, the touch lead T is a double-layer wiring. As shown in FIG. 4, the touch lead T includes a first layer wiring Ta and a second layer wiring Tb, the first layer wiring Ta and the second layer wiring Tb that form the touch lead T are connected, which is equivalent to increasing a thickness of the formed touch lead T, so that the purpose of reducing the resistance may be achieved.

However, the touch leads T of the existing FMLOC each is a double-layer wiring, so that an area of the bezel region occupied by the touch leads T in the touch screen is large, and the touch screen has a wide bezel. Thus, the touch screen cannot meet the design requirement of narrow bezel.

Figure 5:
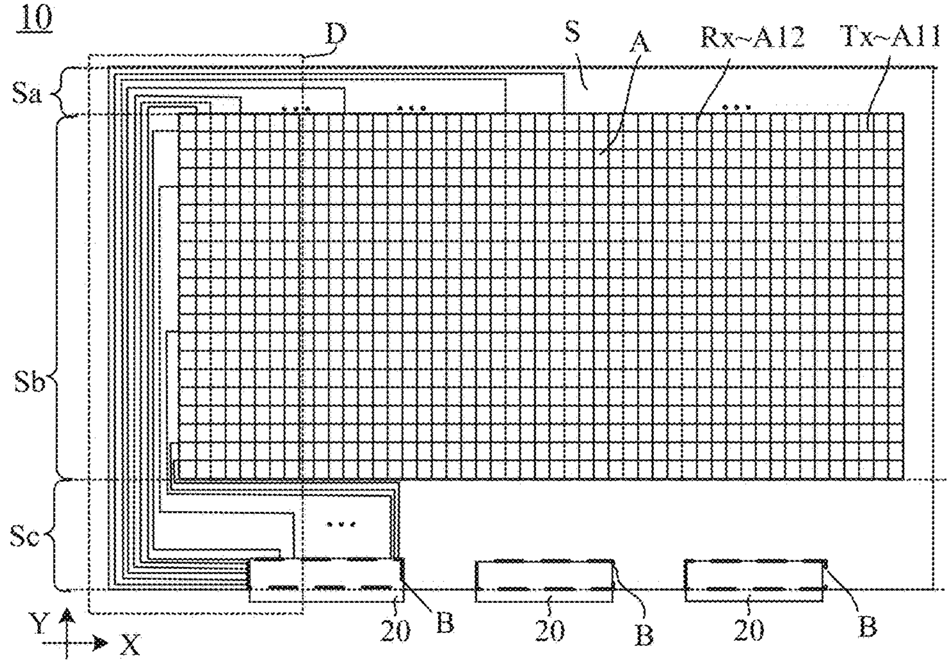
FIG. 5 is a structural diagram of a touch substrate, in accordance with some embodiments of the present disclosure.
Figure 6:
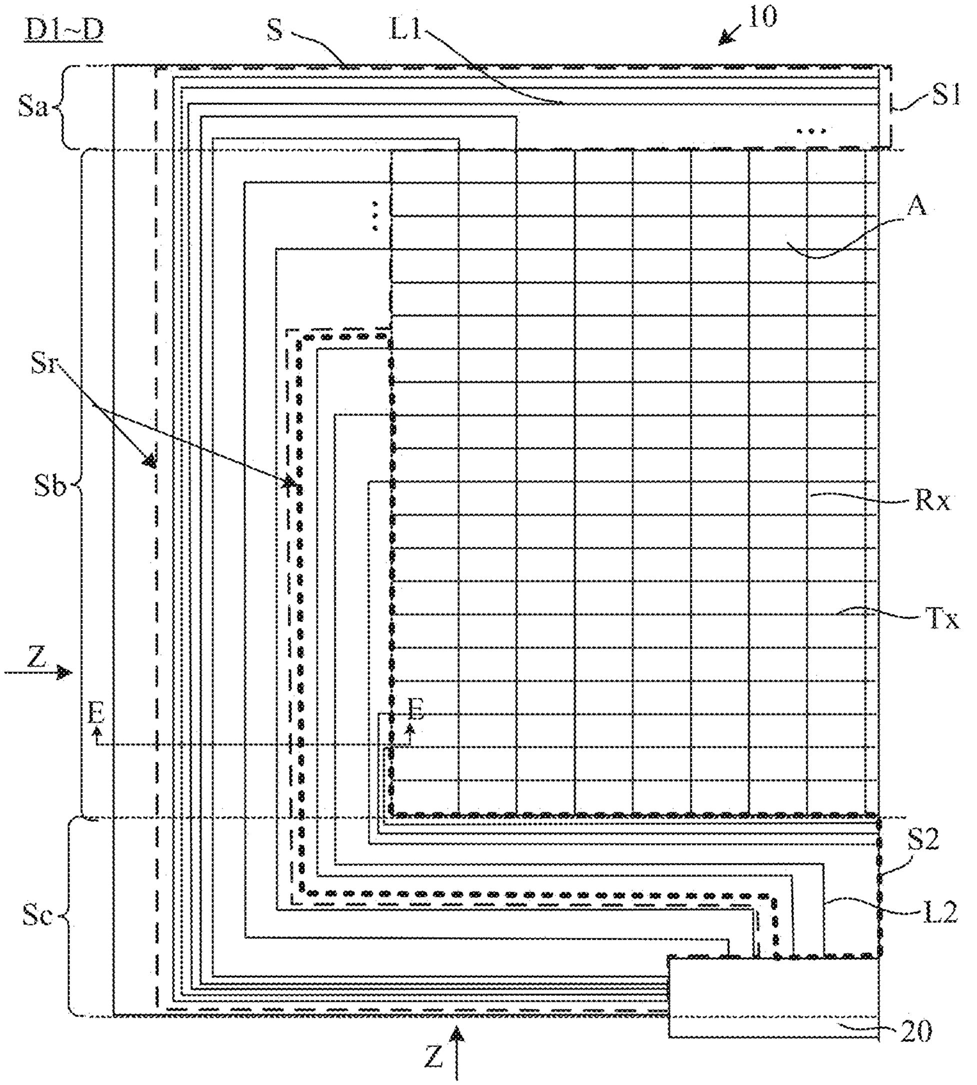
FIG. 6 is an enlarged view at D of the touch substrate in FIG. 5, in accordance with some embodiments of the present disclosure.
Figure 7:
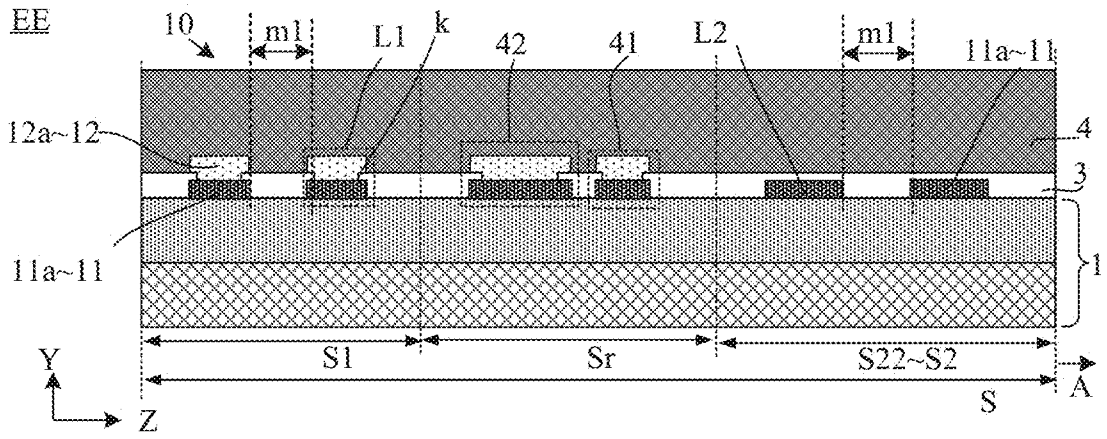
FIG. 7 is a sectional view taken along EE in the enlarged view at D of the touch substrate in FIG. 6, in accordance with some embodiments of the present disclosure.

Based on this, as shown in FIGS. 5 and 6, a touch substrate 10 is provided in the present disclosure. The touch substrate 10 has a touch region A and a peripheral region S located at least one side of the touch region A. As shown in FIG. 7, the touch substrate 10 includes a first layer wiring group 11 and a second layer wiring group 12 that are located in the peripheral region S. The first layer wiring group 11 includes a plurality of first wirings 11*a*, the second layer wiring group 12 includes a plurality of second wirings 12*a*, and a square resistance of a first wiring 11*a* is greater than a square resistance of a second wiring 12*a*. The peripheral region S includes a first wiring region S1 and a second wiring region S2, and at least a portion of the first wiring region S1 is farther from the touch region A than the second wiring region S2. The first wiring region S1 is provided with at least one first-type touch lead L1 therein. Each first-type touch lead L1 includes a first wiring 11*a* and a second wiring 12*a* connected to each other, and orthographic projections of the first wiring 11*a* and the second wiring 12*a* of the first-type touch lead L1 on the touch substrate 10 are overlapped. The second wiring region S2 is provided with at least one second-type touch lead L2 therein. Each second-type touch lead L2 includes a second wiring 12*a* or a first wiring 11*a*, and a length d1 of the first-type touch lead L1 is greater than a length d2 of the second-type touch lead L2.

In some examples, referring to FIGS. 5 and 6 again, the touch substrate 10 has the touch region A and the peripheral region S located on three sides of the touch region A. The peripheral region is divided into a first side peripheral region Sa, a second side peripheral region Sb, and a third side peripheral region Sc in a second direction Y, and a boundary line of the first side peripheral region Sa and the second side peripheral region Sb is parallel to a first direction X.

For example, the touch substrate 10 may have the touch region A and the peripheral region S located on a side, two sides, or four sides of the touch region A, which is not limited herein.

It will be noted that FIG. 6 is an enlarged view at D of the touch substrate 10 in FIG. 5, and is represented by D1. Different touch substrates 10 have different structures at D, which are represented by D2, D3 . . . Dn, respectively, and n is a positive integer greater than or equal to 1. It will be understood that in subsequent drawings, D1, D2, D3 . . . Dn respectively indicate enlarged views of different touch substrates 10 at the same position D.

In some examples, referring to FIG. 7 again, the first layer wiring group 11 and the second layer wiring group 12 of the touch substrate 10 located in the peripheral region S are located in different layers. The square resistance of the first wiring 11*a* of the first layer wiring group 11 is greater than the square resistance of the second wiring 12*a* of the second layer wiring group 12.

It will be noted that the square resistance has a characteristic that a measured value is the same for any size square, and a magnitude of the square resistance is independent of a size of a sample. The square resistance is also referred to as a sheet resistance. For example, a value of the square resistance of the first wiring 11*a* is 0.191, a value of the square resistance of the second wiring 12*a* is 0.1, and the square resistance of the first wiring 11*a* is greater than the square resistance of the second wiring 12*a*.

Different wiring regions are disposed in the peripheral region S, and the wiring structures in the different wiring regions are different in type. For example, referring to FIGS. 6 and 7 again, the peripheral region S includes the first wiring region S1 and the second wiring region S2. The first wiring region S1 extends sequentially along the first side peripheral region Sa, the second side peripheral region Sb and the third side peripheral region Sc. The second wiring region S2 extends sequentially along the second side peripheral region Sb and the third side peripheral region Sc. For example, in the second side peripheral region Sb, a partial region of the first wiring region S1 is farther from the touch region A than the second wiring region S2 in a direction Z from the peripheral region S to the touch region A. In the third side peripheral region Sc, a partial region of the first wiring region S1 is farther from the touch region A than the second wiring region S2 in the direction Z from the peripheral region S to the touch region A.

As shown in FIG. 7, the first-type touch lead L1 in the first wiring region S1 includes the first wiring 11*a* and the second wiring 12*a* connected to each other, and the orthographic projections of the first wiring 11*a* and the second wiring 12*a* of the first-type touch lead L1 on the touch substrate 10 are overlapped. That is, in the second direction Y perpendicular to a plane where the touch substrate 10 is located, the first wiring 11*a* and the second wiring 12*a* of the first-type touch lead L1 may be arranged in parallel.

Moreover, the first wiring 11*a* and the second wiring 12*a* of the first-type touch lead L1 are connected to each other. For example, an insulating layer 3 is provided between the first layer wiring group 11 and the second layer wiring group 12, and the first wiring 11*a* and the second wiring 12*a* of the first-type touch lead L1 are connected through a plurality of vias k penetrating the insulating layer 3. A square resistance of the first-type touch lead L1 formed by the first wiring 11*a* and the second wiring 12*a* that are connected through the vias k is less than the square resistance of the first wiring 11*a*, and is less than the square resistance of the second wiring 12*a*. For example, a value of the square resistance of the first-type touch lead L1 is 0.066. A touch lead formed by a double-layer wiring (i.e., the first wiring 11*a* and the second wiring 12*a* connected to each other) has a small resistance, so that the requirement for a small voltage drop of a long wiring may be satisfied.

In some examples, as shown in FIG. 7, the second wiring region S2 is provided with a plurality of second-type touch leads L2 therein. Each second-type touch lead L2 includes a first wiring 11*a*, and a square resistance of the first wiring 11*a* is greater than a square resistance of a double-layer wiring. Therefore, it can be considered that the square resistance of the first-type touch lead L1 is less than the square resistance of the second-type touch lead L2. In a case where the lengths of the first-type touch lead L1 and the second-type touch lead L2 are equal, the resistance of the first-type touch lead L1 is less than the resistance of the second-type touch lead L2.

Therefore, for the above problem of the winding design of the touch lead due to the fact that the length of each touch lead is required to be substantially equal to realize the equal resistances of the touch leads, as designed in the technical solutions of the present disclosure, the first-type touch lead has a small square resistance by using the design of the double-layer wiring, and the second-type touch lead L2 has a large square resistance by using the design of the single-layer wiring, so that the second-type touch lead L2 does not need to be extended to be equal to the first-type touch lead L1 in length. Thus, the winding design of the touch lead is reduced or avoided, so that the purpose of reducing the space of the peripheral region S occupied by the touch leads may be achieved.

It will be noted that the touch lead is a general name for each type of touch leads in the peripheral region S of the touch substrate 10, and for example, is any one of the first-type touch lead L1, the second-type touch lead L2 and a third-type touch lead L3 below.

Figure 8:
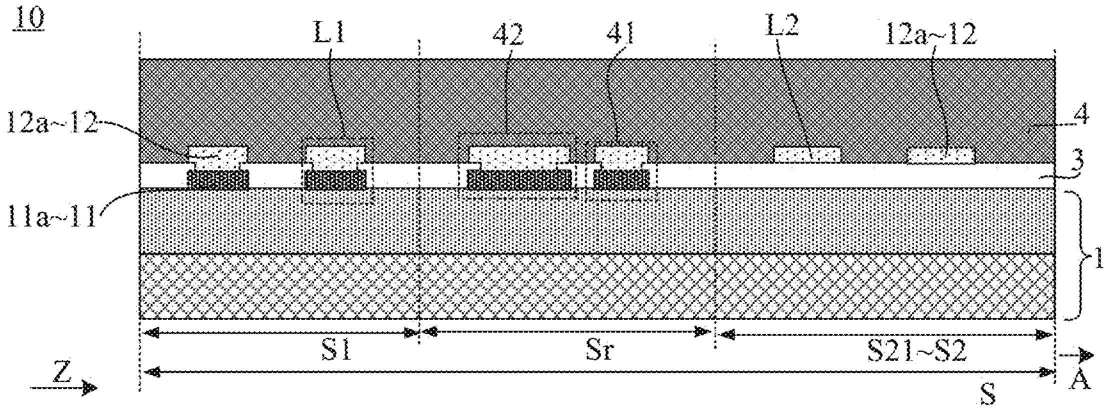
FIG. 8 is a sectional view of a touch substrate, in accordance with some embodiments of the present disclosure.

In some examples, as shown in FIG. 8, the second wiring region S2 is provided with a plurality of second-type touch leads L2 therein. Each second-type touch lead L2 includes a second wiring 12*a*, and a square resistance of the second wiring 12*a* is greater than the square resistance of the double-layer wiring, so that the wirings of the touch leads may also be reduced or avoided, which is not repeated here.

The partial region of the first wiring region S1 is farther from the touch region A than the second wiring region S2, and the square resistance of the first-type touch lead L1 in the first wiring region S1 is less than the square resistance of the second-type touch lead L2 in the second wiring region S2. Therefore, when the touch lead T is designed, the length of the first-type touch lead L1 may be greater than the length of the second-type touch lead L2, and the first-type touch lead L1 is disposed on the periphery of the second-type touch lead L2, thereby reducing or avoiding the winding design of the second-type touch lead L2.

It will be noted that the length of the touch lead is a total length of the touch lead from the end of the touch sensing line Rx or the touch driving line Tx connected to the touch lead to the conductive contact (not shown in the figure) on the FPC.

In the present disclosure, the touch leads with two types of structures are disposed, and include double-layer lead(s) (e.g., the first-type touch lead(s) L1) and single-layer lead(s) (e.g., the second-type touch lead(s) L2). The square resistances of the touch leads with the two types of structures are different. The first-type touch lead L1 with a smaller square resistance is used as a touch lead with a longer extending length, and for example, the first-type touch lead L1 may be designed to extend around a periphery of the touch substrate 10. The second-type touch lead L2 with a larger square resistance is used as a touch lead with a shorter extending length. Therefore, the winding design of the touch lead in the peripheral region S may be effectively reduced or avoided, thereby realizing narrow bezel.

In some embodiments, the resistance of the first-type touch lead L1 is substantially equal to the resistance of the second-type of touch lead L2.

It will be noted that the resistance of the first-type touch lead L1 is substantially equal to the resistance of the second-type touch lead L2, which means that the resistances of all the touch leads are substantially equal.

Therefore, in the present disclosure, the touch leads with different square resistances are disposed, so that in a case where the lengths of the touch leads are different, the design of the touch leads with substantially equal resistances may be realized, thereby avoiding the winding design of the touch lead connected to the touch driving line Tx that is close to the driving IC.

Figure 9:
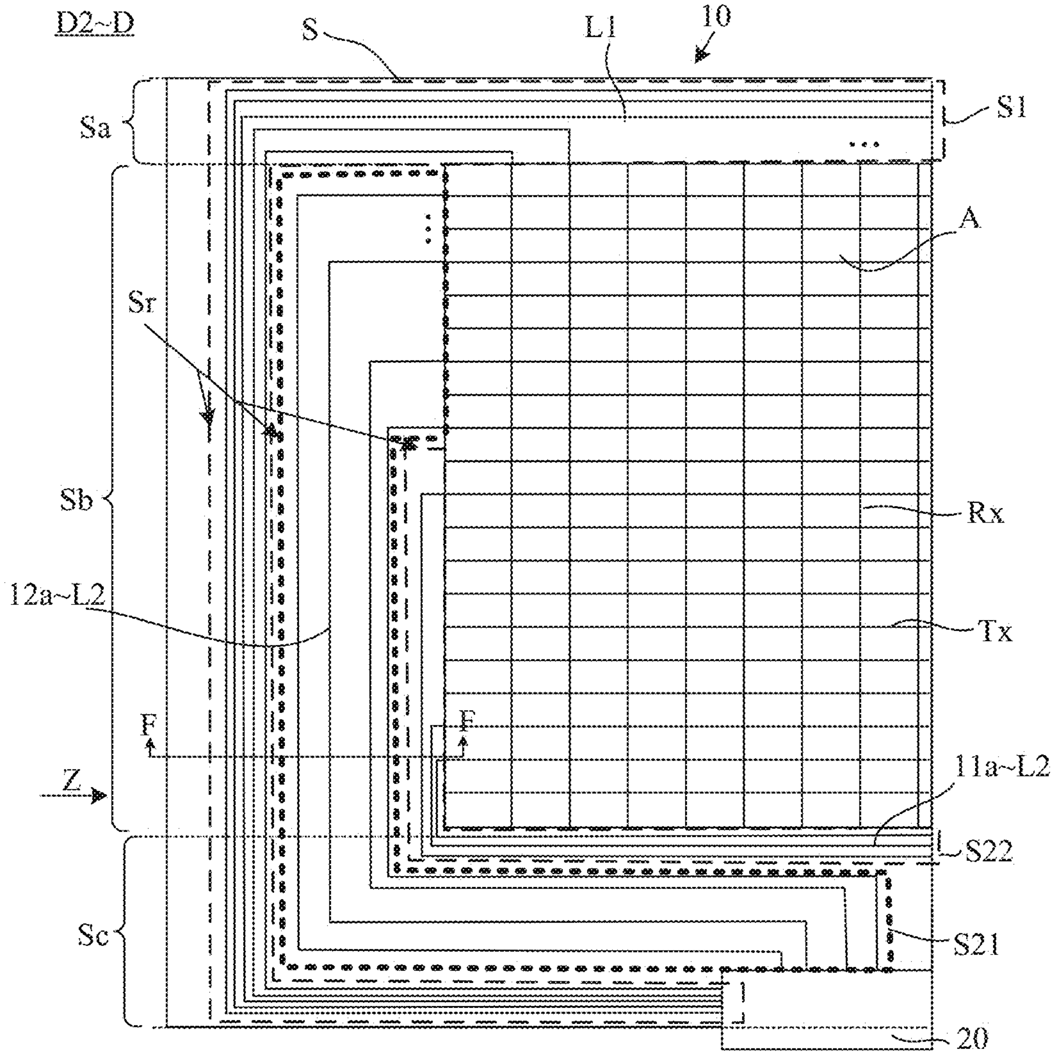
FIG. 9 is another enlarged view at D of the touch substrate in FIG. 5, in accordance with some embodiments of the present disclosure.
Figure 10:
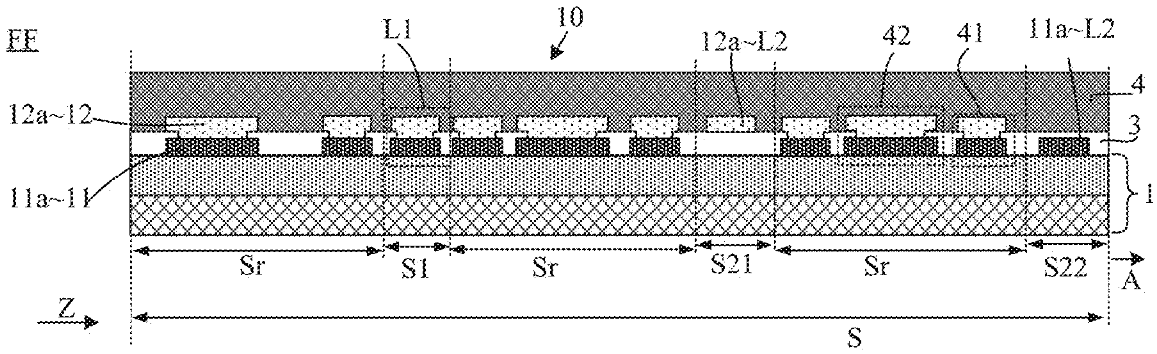
FIG. 10 is a sectional view taken along FF in the enlarged view at D of the touch substrate in FIG. 9, in accordance with some embodiments of the present disclosure.

In some embodiments, as shown in FIGS. 9 and 10, the second wiring region S2 includes a first wiring sub-region S21 and a second wiring sub-region S22. A second-type touch lead L2 disposed in the first wiring sub-region S21 includes a second wiring 12*a*, and a second-type touch lead L2 disposed in the second wiring sub-region S2 includes a first wiring 11*a*. At least a portion of the first wiring sub-region S21 is farther from the touch region A than the second wiring sub-region S22. A length of the second-type touch lead L2 in the first wiring sub-region S21 is greater than a length of the second-type touch lead L2 in the second wiring sub-region S22.

In some examples, referring to FIG. 9 again, the second-type touch lead L2 in the first wiring sub-region S21 is the second wiring 12*a*, and the first wiring sub-region S21 includes second-type touch leads L2. The first wiring sub-region S21 extends sequentially along the second side peripheral region Sb and the third side peripheral region Sc. The second-type touch lead L2 in the second wiring sub-region S22 is the first wiring 11*a*, and the second wiring sub-region S22 includes second-type touch leads L2. The second wiring sub-region S22 extends sequentially along the second side peripheral region Sb and the third side peripheral region Sc.

For example, as shown in FIGS. 9 and 10, in the second side peripheral region Sb, a partial region of the first wiring sub-region S21 is farther from the touch region A than the second wiring sub-region S22 in the direction Z from the peripheral region S to the touch region A. That is, compared with the second wiring sub-region S22, the first wiring sub-region S21 is located on a periphery of the touch region A. In a case of no winding, the length of the second-type touch lead L2 in the first wiring sub-region S21 is greater than the length of the second-type touch lead L2 in the second wiring sub-region S22.

Since the square resistance of the first wiring 11*a* is greater than the square resistance of the second wiring 12*a*, the design of the touch leads with substantially equal resistances may be realized without winding, so that the winding design of the second-type touch lead L2 in the second wiring sub-region S22 may be reduced or avoided.

It will be noted that, as shown in FIGS. 7, 8 and 10, the touch substrate 10 may include the first wiring sub-region S21 and the second wiring sub-region S22, or may include only one of the first wiring sub-region S21 and the second wiring sub-region S22, which is not limited herein.

In the drawings, only one or two touch leads are drawn to represent a sectional structure of a touch lead in a region, which are not limitations on the number of the touch leads. For example, only one first-type touch lead L1 is drawn in the first wiring region S1 in FIG. 10 to illustrate the structure of the first-type touch lead L1 in this region, and the number of the first-type touch lead(s) L1 may be one or more, which is not limited herein.

Figure 11:
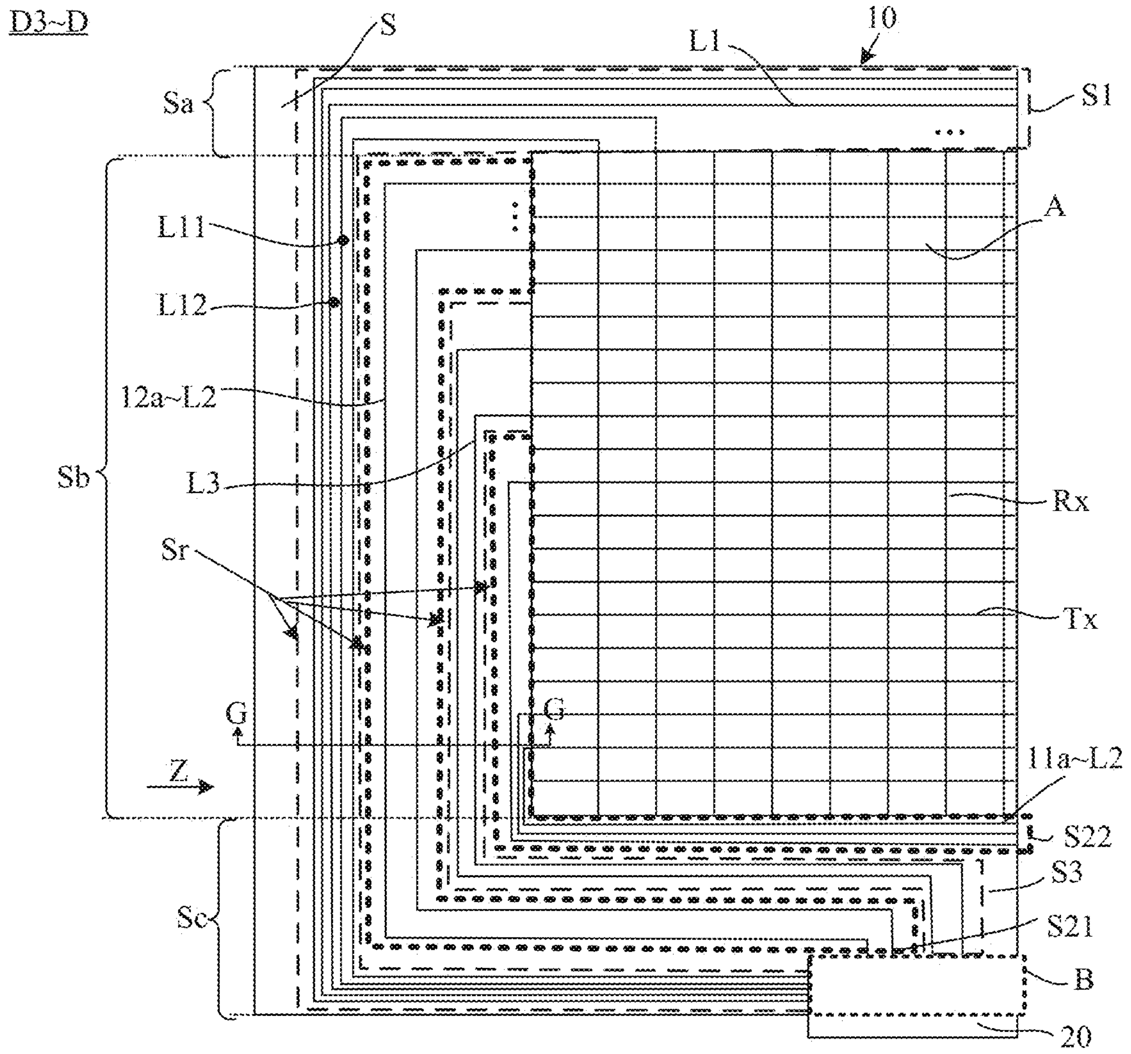
FIG. 11 is yet another enlarged view at D of the touch substrate in FIG. 5, in accordance with some embodiments of the present disclosure.
Figure 12:
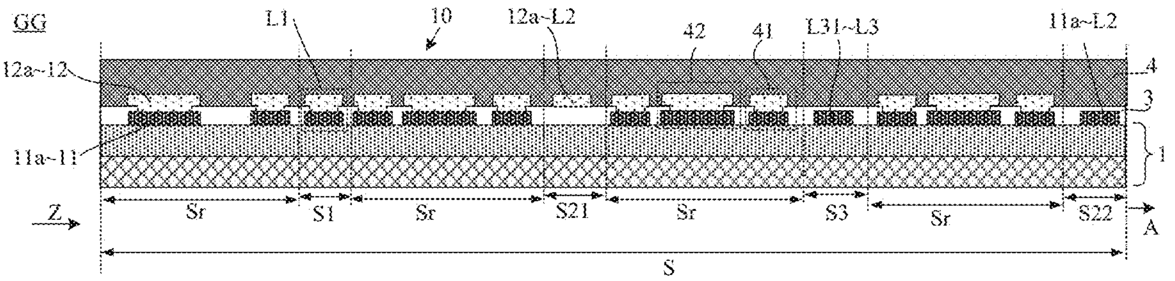
FIG. 12 is a sectional view taken along GG in the enlarged view at D of the touch substrate in FIG. 11, in accordance with some embodiments of the present disclosure.

In some embodiments, as shown in FIGS. 11 and 12, the peripheral region S further includes a third wiring region S3. At least a portion of the third wiring region S3 is closer to the touch region A than the first wiring sub-region S21, and is farther from the touch region A than the second wiring sub-region S22. The third wiring region S3 is provided with at least one third-type touch lead L3 therein. Each third-type touch lead L3 includes a first segment L31 and a second segment L32 connected to each other in an extending direction of the third-type touch lead L3. The first segment L31 includes a first wiring 11*a*, and the second segment L32 includes a second wiring 12*a*. A length of the third-type touch lead L3 is greater than the length of the second-type touch lead L2 in the second wiring sub-region S22, and is less than the length of the second-type touch lead L2 in the first wiring sub-region S21.

In some examples, as shown in FIG. 11, the third wiring region S3 extends sequentially along the second side peripheral region Sb and the third side peripheral region Sc. For example, in the second side peripheral region Sb, in the direction Z from the peripheral region S to the touch region A, a partial region of the third wiring region S3 is closer to the touch region A than the first wiring sub-region S21, and is farther from the touch region A than the second wiring sub-region S22. That is, the partial region of the third wiring region S3 is between the first wiring sub-region S21 and the second wiring sub-region S22.

Figure 13:
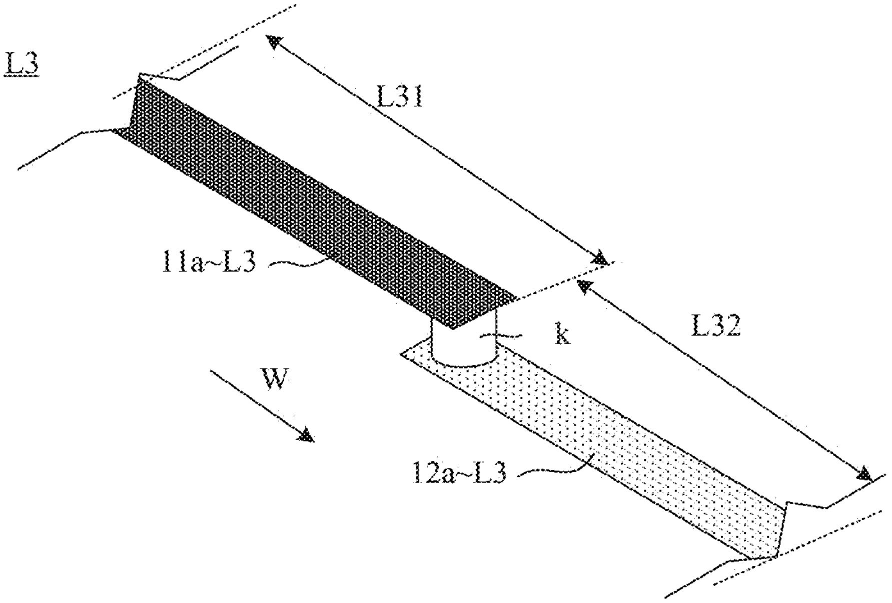
FIG. 13 is a structural diagram of a third-type touch lead, in accordance with some embodiments of the present disclosure.
Figure 14:
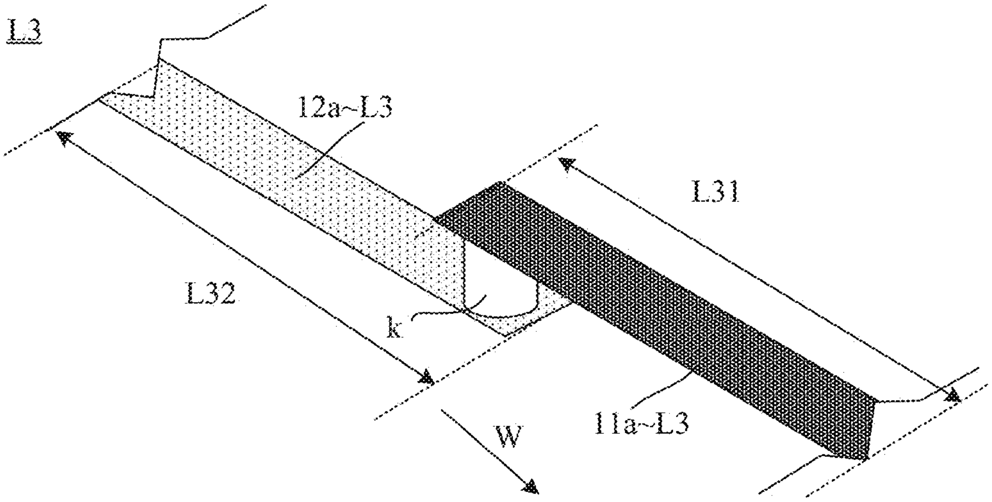
FIG. 14 is another structural diagram of a third-type touch lead, in accordance with some embodiments of the present disclosure.

As shown in FIGS. 13 and 14, the third-type touch lead L3 in the third wiring region S3 includes the first segment L31 and the second segment L32 connected to each other in the extending direction W of the third-type touch lead L3. The first segment L31 is the first wiring 11*a*, and the second segment L32 is the second wiring 12*a*. That is, the first segment L31 and the second segment L32 of the third-type touch lead L3 are located in different wiring layers. Adjacent ends of the first wiring 11*a* and the second wiring 12*a* of the third-type touch lead L3 may be connected through a via k.

Since the square resistance of the first wiring 11*a* is greater than the square resistance of the second wiring 12*a*, a square resistance of the third-type touch lead L3 formed by connecting the first wiring 11*a* and the second wiring 12*a* is between the square resistance of the first wiring 11*a* and the square resistance of the second wiring 12*a*.

Therefore, the length of the third-type touch lead L3 may be designed to be greater than the length of the second-type touch lead L2 in the second wiring sub-region S22 and less than the length of the second-type touch lead L2 in the first wiring sub-region S21, so that the winding design of the touch lead with a short length may be reduced or avoided.

It will be noted that the extending direction W of the third-type touch lead L3 may be understood as an extending direction of a wiring of the third-type touch lead L3 from an end of the touch sensing line Rx or the touch driving line Tx connected to the third-type touch lead L3 to the driving IC.

In some examples, as shown in FIGS. 15 to 18, the touch substrate 10 may have the first wiring sub-region S21 and the second wiring sub-region S22, or may include any one of the first wiring sub-region S21 and the second wiring sub-region S22, which is not limited herein.

Figure 15:
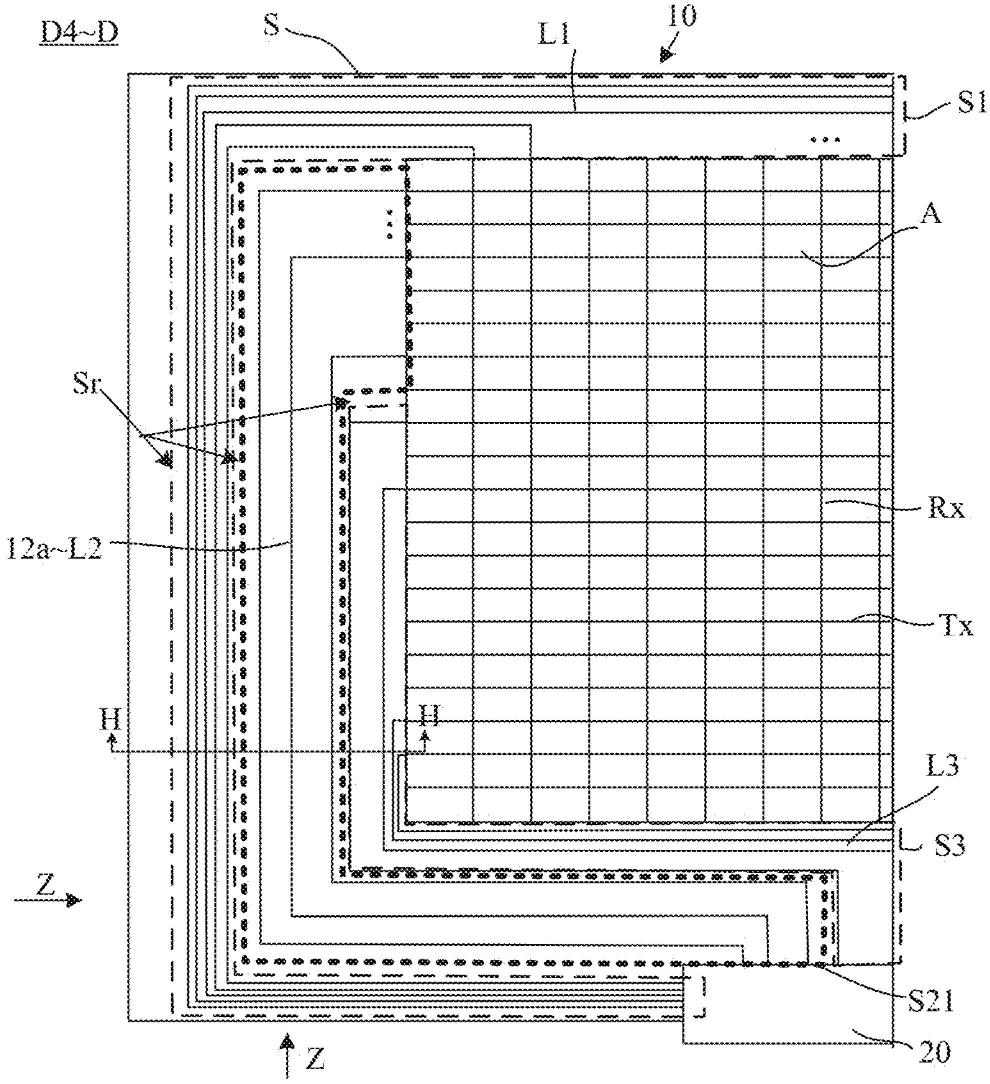
FIG. 15 is yet another enlarged view at D of the touch substrate in FIG. 5, in accordance with some embodiments of the present disclosure.
Figure 16:
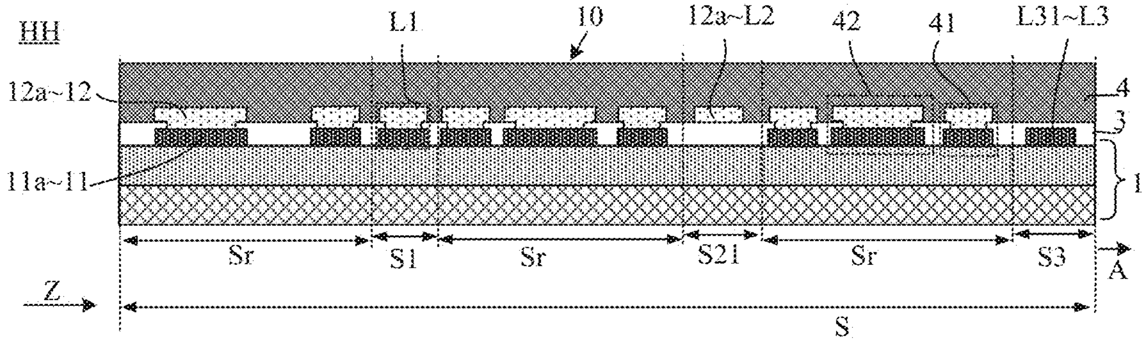
FIG. 16 is a sectional view taken along HH in the enlarged view at D of the touch substrate in FIG. 15, in accordance with some embodiments of the present disclosure.

For example, as shown in FIGS. 15 and 16, the touch substrate 10 has the first wiring region S1, the first wiring sub-region S21 and the third wiring region S3. The first wiring region S1 extends sequentially along the first side peripheral region Sa, the second side peripheral region Sb and the third side peripheral region Sc. The first wiring sub-region S21 extends sequentially along the second side peripheral region Sb and the third side peripheral region Sc. The third wiring region S3 extends sequentially along the second side peripheral region Sb and the third side peripheral region Sc.

In the second side periphery region Sb, in the direction Z from the periphery region S to the touch region A, the first wiring region S1 is farther from the touch region A than the first wiring sub-region S21, and a partial region of the first wiring sub-region S21 is farther from the touch region A than the third wiring region S3. In the third side periphery region Sc, the first wiring region S1 is farther from the touch region A than the first wiring sub-region S21, and the first wiring sub-region S21 is farther from the touch region A than the third wiring region S3.

The square resistance of the first-type touch lead L1 is less than the square resistance of the second-type touch lead L2 in the first wiring sub-region S21, and the square resistance of the second-type touch lead L2 in the first wiring sub-region S21 is less than the square resistance of the third-type touch lead L3. Therefore, in order to realize the design of the equal resistances of the first-type touch lead L1, the second-type touch lead L2 in the first wiring sub-region S21 and the third-type touch lead L3, the length of the first-type touch lead L1 needs to be greater than the length of the second-type touch lead L2 in the first wiring sub-region S21, and the length of the second-type touch lead L2 in the first wiring sub-region S21 needs to be greater than the length of the third-type touch lead L3. The problem that the lengths of all the touch leads need to be designed to be substantially equal is avoided, and the winding design of the second-type touch lead L2 in the first wiring sub-region S21 and the third-type touch lead L3 may be reduced or avoided.

Figure 17:
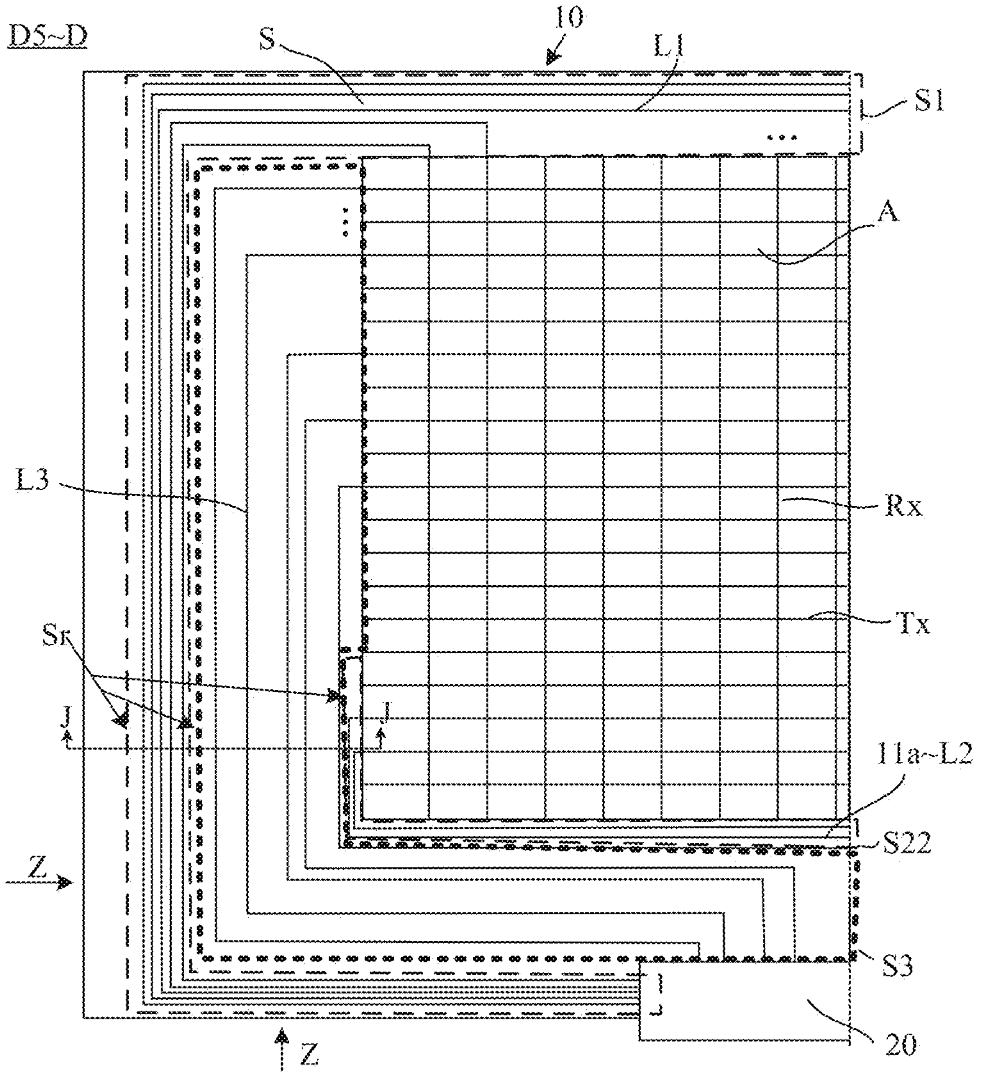
FIG. 17 is yet another enlarged view at D of the touch substrate in FIG. 5, in accordance with some embodiments of the present disclosure.
Figure 18:
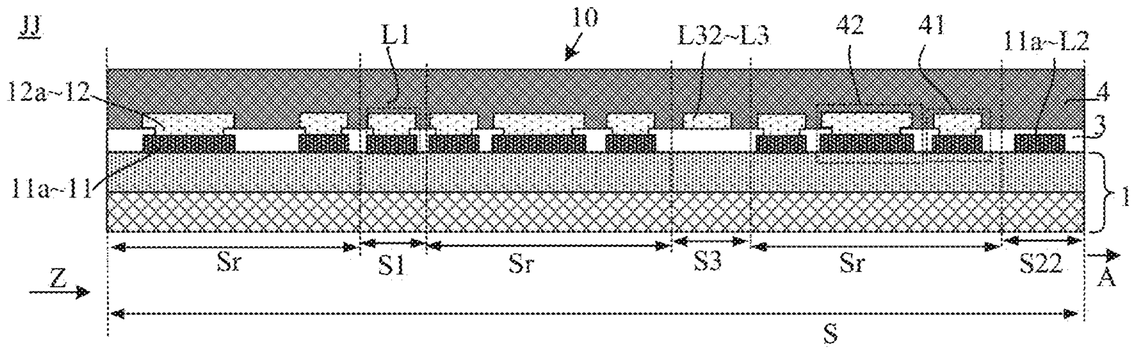
FIG. 18 is a sectional view taken along JJ in the enlarged view at D of the touch substrate in FIG. 17, in accordance with some embodiments of the present disclosure.

For example, as shown in FIGS. 17 and 18, the touch substrate 10 has the first wiring region S1, the third wiring region S3 and the second wiring sub-region S22. The first wiring region S1 extends sequentially along the first side peripheral region Sa, the second side peripheral region Sb and the third side peripheral region Sc. The third wiring region S3 extends sequentially along the second side peripheral region Sb and the third side peripheral region Sc. The second wiring sub-region S22 extends sequentially along the second side peripheral region Sb and the third side peripheral region Sc.

In the second side periphery region Sb, in the direction Z from the periphery region S to the touch region A, the first wiring region S1 is farther from the touch region A than the third wiring region S3, and the partial region of the third wiring region S3 is farther from the touch region A than the second wiring sub-region S22. In the third side periphery region Sc, the first wiring region S1 is farther from the touch region A than the third wiring region S3, and the third wiring region S3 is farther from the touch region A than the second wiring sub-region S22.

The square resistance of the first-type touch lead L1 is less than the square resistance of the third-type touch lead L3, and the square resistance of the third-type touch lead L3 is less than the square resistance of the second-type touch lead L2 in the second wiring sub-region S22. Therefore, in order to realize the design of the equal resistances of the first-type touch lead L1, the third-type touch lead L3 and the second-type touch lead L2 in the second wiring sub-region S22, the length of the first-type touch lead L1 needs to be greater than the length of the third-type touch lead L3, and the length of the third-type touch lead L3 needs to be greater than the length of the second-type touch lead L2 in the second wiring sub-region S22. The problem that the lengths of all the touch control leads need to be designed to be substantially equal is avoided, and the winding design of the third-type touch lead L3 and the second-type touch lead L2 in the second wiring sub-region S22 may be reduced or avoided.

It will be noted that the divisions of the first wiring region S1, the first wiring sub-region S21, the third wiring region S3 and the second wiring sub-region S22 in the drawings are only examples, and are not limitations on the first wiring region S1, the first wiring sub-region S21, the third wiring region S3 and the second wiring sub-region S22.

In some embodiments, a resistance of the third-type touch lead L3 is substantially equal to the resistance of the first-type touch lead L1, and is substantially equal to the resistance of the second-type touch lead L2.

According to the above description that the resistances of the touch leads in the touch substrate 10 need to be designed equally, it can be seen that the resistances of each type of touch leads in the touch substrate 10 need to be set to be substantially equal, which is not repeated here. Each type of touch leads includes the first-type touch leads L1, the second-type touch leads L2 or the third-type touch leads L3.

In some embodiments, referring to FIG. 11 again, each type of touch leads includes a plurality of touch leads arranged in a direction towards the touch region A, and the lengths of the plurality of touch leads are gradually reduced in the direction Z from the peripheral region S to the touch region A. Each type of touch leads includes any one of the first-type touch leads L1, the second-type touch leads L2 and the third-type touch leads L3. It will be understood that the closer to the touch region, the shorter the length of the touch lead.

For example, referring to FIG. 11 again, lengths of a plurality of first-type touch leads L1 arranged in the direction Z from the peripheral region S to the touch region A are gradually reduced. For example, in the second side peripheral region Sb, a first-type touch lead L11 is closer to the touch region A than a first-type touch lead L12 in the direction Z from the peripheral region S to the touch region A. Then, the length of the first-type touch lead L11 is less than the length of the first-type touch lead L12. The touch lead is not designed to be wound, so that an area of the peripheral region S occupied by the wiring of the touch leads may be reduced.

It will be noted that, the design of the gradually reduced lengths of the second-type touch leads L2 and the design of the gradually reduced lengths of the third-type touch leads L3 may refer to the first-type touch leads L1, and will not be repeated here.

That is, as shown in FIG. 11, the wiring of the touch leads is performed in the peripheral region S in a direction of connecting the touch sensing line Rx or the touch driving line Tx to the flexible printed circuit 20, and adjacent touch leads may be arranged in parallel in extending directions thereof, so as to avoid a cross effect of the touch leads. A touch lead between an end of a touch sensing line Rx or a touch driving line Tx that is away from the flexible printed circuit 20 and the flexible printed circuit 20 is long, and the wiring of this type of touch lead is performed along a periphery of the peripheral region S, so as to realize the design that the touch leads are gradually shortened in the peripheral region S in the direction Z, thereby avoiding the winding design of the touch lead. Specific implementation of the design of the touch leads with substantially equal resistances requires a combination of an influence of a line width of the touch lead, as described below, and will not be repeated here.

In some embodiments, referring to FIG. 11 again, the peripheral region S located on the least one side of the touch region A is provided with bonding region(s) B therein. The at least one first-type touch lead L1, the at least one second-type touch lead L2, and the at least one third-type touch lead L3 are gathered to the bonding region(s) B.

In some examples, as shown in FIG. 11, the bonding region B is disposed in the third side peripheral region Sc. At least one first-type touch lead L1, at least one second-type touch lead L2 and at least one third-type touch lead L3 are connected to a portion of the flexible printed circuit 20 located in the bonding region B after being gathered to the bonding region B, e.g., are connected to the conductive contact on the flexible printed circuit 20. The flexible printed circuit 20 connects the touch leads to the above driving IC (not shown in the figures), so as to realize communication of signal transmission lines.

It will be noted that the position of the bonding region B is exemplarily described in these embodiments, and the position of the bonding region B is not limited thereto.

In some examples, as shown in FIG. 5, there may be a plurality of bonding regions B in the touch substrate 10. For example, three bonding regions B are disposed, and the three bonding regions B may be all located in the third side periphery region Sc. The number of the touch leads gathered to each of the three bonding regions B may be equal. That is, all the touch leads in the touch substrate 10 are equally divided into three parts, and each part is gathered to a bonding region B.

For example, in a case where the touch substrate 10 has the plurality of bonding regions B, the number of the touch leads gathered to each bonding region B may not be equal, which is not limited herein.

In some embodiments, as shown in FIG. 7, a distance m1 between every two adjacent touch leads in the plurality of touch leads of each type of touch leads is 3 μm to 5 μm.

For example, the distance m1 between two adjacent touch leads in each type of touch leads is 3 μm, 4 μm, or 5 μm, which is not limited herein.

Figure 19:
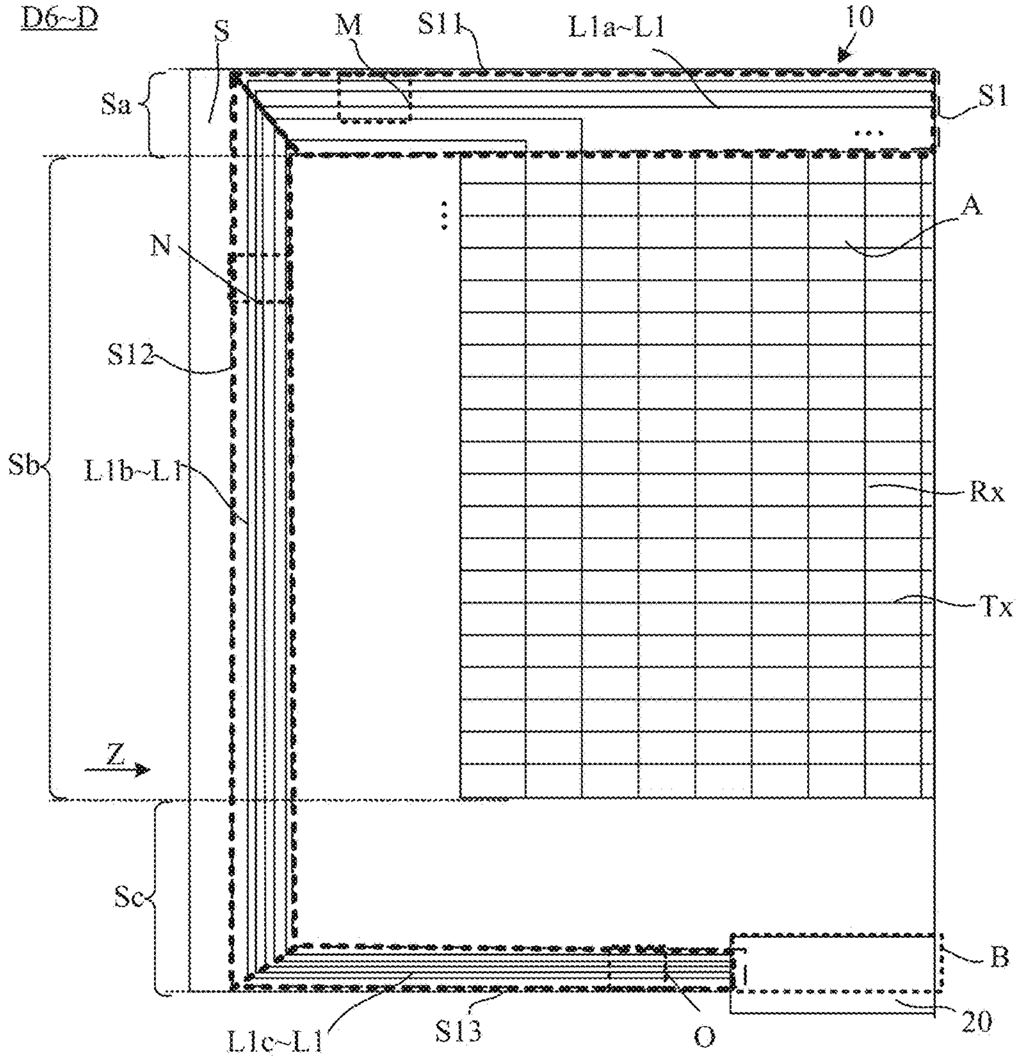
FIG. 19 is yet another enlarged view at D of the touch substrate in FIG. 5, in accordance with some embodiments of the present disclosure.

In some embodiments, as shown in FIG. 19, the peripheral region S includes the first wiring region S1, and the first wiring region S1 includes a first region S11, a second region S12 and a third region S13 connected in sequence. The first region S11 is located in the first side peripheral region Sa of the touch region A, the second region S12 is located in the second side peripheral region Sb of the touch region A, and the third region S13 is located in the third side peripheral region Sc of the touch region A. The first-type touch lead L1 includes a first extending segment L1*a*, a second extending segment L1*b* and a third extending segment L1*c* connected in sequence. The first extending segment L1*a* is located in the first region S11, the second extending segment L1*b* is located in the second region S12, and the third extending segment L1*c* is located in the third region S13.

A wiring width k1 of the first extending segment L1*a* is greater than a wiring width k2 of the second extending segment L1*b*, and the wiring width k2 of the second extending segment L1*b* is greater than a wiring width k3 of the third extending segment L1*c*.

In some examples, referring to FIG. 19 again, the first-type touch lead L1 in the first wiring region S1 is a double-layer wiring with a smallest square resistance, so that the first-type touch lead L1 may be disposed on the periphery of the peripheral region S away from the touch region A, and the length of the first-type touch lead L1 is greater than that of other type of touch lead.

The first wiring region S1 may extend along the multi-side peripheral region of the peripheral region S. For example, as shown in FIG. 19, the first region S11 is located in the first side peripheral region Sa, the second region S12 is located in the second side peripheral region Sb, and the third region S13 is located in the third side peripheral region Sc. Moreover, an end of the second region S12 has a portion located in the first side peripheral region Sa, and another end of the second region S12 has a portion located in the third side peripheral region Sc. The first region S11, the second region S12, and the third region S13 are named as regions where portions of the plurality of touch leads extending in a direction are respectively located.

Figure 20:
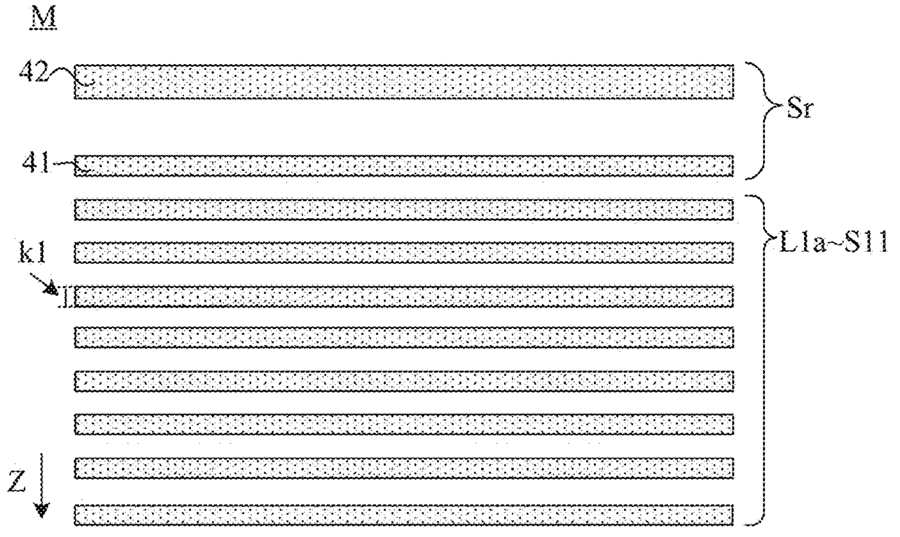
FIG. 20 is an enlarged view at M of the touch substrate in FIG. 19, in accordance with some embodiments of the present disclosure.
Figure 21:
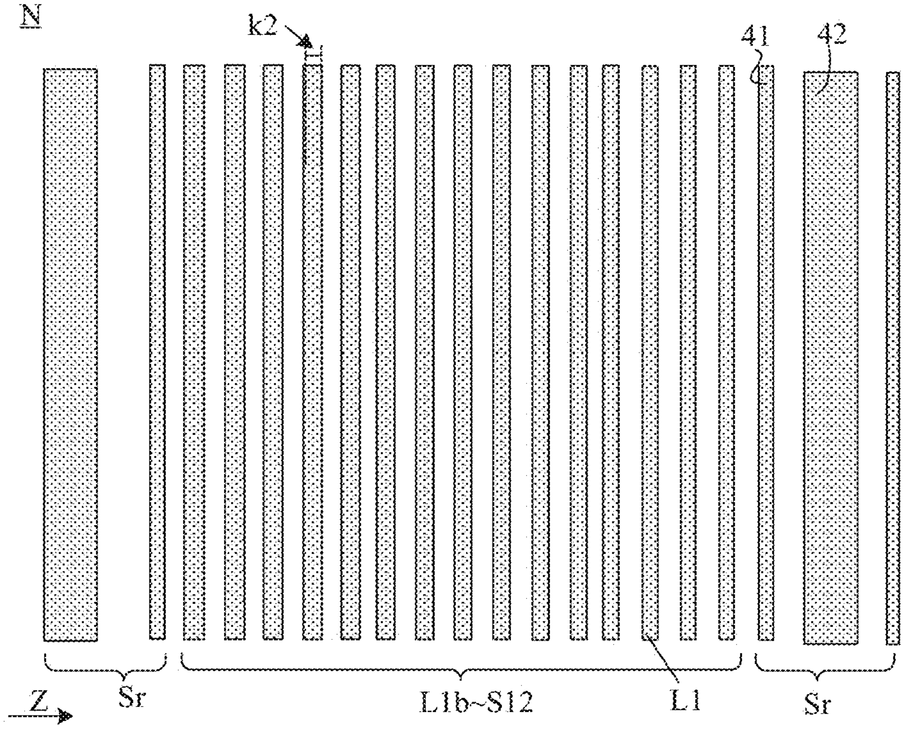
FIG. 21 is an enlarged view at N of the touch substrate in FIG. 19, in accordance with some embodiments of the present disclosure.
Figure 22:
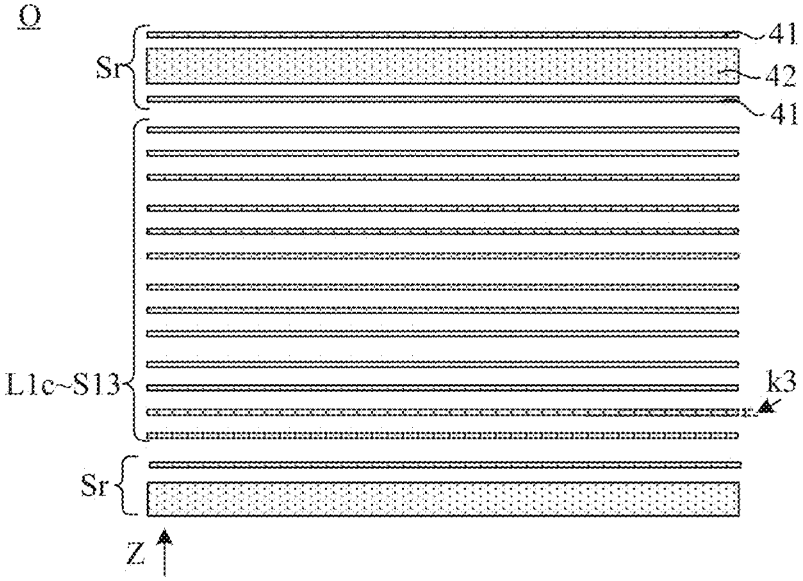
FIG. 22 is an enlarged view at O of the touch substrate in FIG. 19, in accordance with some embodiments of the present disclosure.

As shown in FIGS. 20, 21 and 22, the wiring width k1 of the first extending segment L1*a* is greater than the wiring width k2 of the second extending segment L1*b*, and the wiring width k2 of the second extending segment L1*b* is greater than the wiring width k3 of the third extending segment L1*c*. A wiring width may be understood as a dimension of a touch lead along a direction perpendicular to an extending direction of the touch lead. Since the first-type touch lead L1 includes three extending segments sequentially extending along different directions, the width of the first-type touch lead L1 has three values.

For example, the wiring width of the first extending segment L1*a* may be 50 μm. The wiring width k2 of the second extending segment L1*b* is in a range of 4 μm to 9 μm, inclusive. For example, the wiring width k2 of the second extending segment L1*b* is 4 μm, 4.6 μm, 5.2 μm, 6.3 μm, 6.9 μm, 7.3 μm, 8.4 μm or 9 μm, which is not limited herein. The wiring width of the third extending segment L1*c* may be 8.8 μm.

In some embodiments, as shown in FIG. 21, the at least one first-type touch lead L1 includes a plurality of first-type touch leads L1. In the second region S12, the wiring widths k2 of the second extending segments L1*b* of the plurality of first-type touch leads L1 are gradually reduced in the direction Z from the second region S12 to the touch region A.

For example, referring to FIG. 21 again, the wiring widths k2 of the second extending segments L1*b* of the first-type touch leads L1 are sequentially reduced in a range of 9 μm to 4 μm.

The touch leads of different types of structures are designed. As shown in FIG. 12, the first-type touch lead L1 includes the double-layer wiring; the second-type touch lead L2 in the first wiring sub-region S21 includes the second wiring 12*a*; the third-type touch lead L3 includes the first segment L31 and the second segment L32 connected to each other, the first segment L31 is the first wiring 11*a*, and the second segment L32 is the second wiring 12*a*; the second-type touch lead L2 in the second wiring sub-region S22 includes the first wiring 11*a*. Thus, the square resistance of the first-type touch lead L1, the square resistance of the second-type touch lead L2 in the first wiring sub-region S21, the square resistance of the third-type touch lead L3, and the square resistance of the second-type touch lead L2 in the second wiring sub-region S22 are sequentially increased. In combination with the change of the width of the touch lead, the design of the touch leads with substantially equal resistances is realized without winding, so that the purpose of narrow bezel of the touch substrate 10 is realized.

Table 1 shows bezel size values of the touch substrate 10 provided in some embodiments of the present disclosure and a bezel size value of the touch substrate 10 in the related art. It can be seen that by using the technical solutions of the present disclosure, the bezel size of the touch substrate 10 may be reduced by 200 μm to 350 μm. Moreover, the resistance value may be adjusted according to the bezel size. The bezel size and the resistance value of the touch lead are adjusted by adjusting the wiring of the first-type touch lead(s) L1, the second-type touch lead(s) L2 in the first wiring sub-region S21, the third-type touch lead(s) L3 and the second-type touch lead(s) L2 in the second wiring sub-region S22.

TABLE 1 examples of bezel size and resistance value

| | Related example | Example A of the present disclosure | Example B of the present disclosure | Example C of the present disclosure |
|---|---|---|---|---|
| Bezel size (μm) | 1000 | 780 | 604 | 650 |
| Resistance (KΩ) | 0.95 | 0.95 | 2.6 | 3.2 |

In Table 1, in the related example, the double-layer wiring is used as the touch lead in the conventional technology, and the bezel size of the touch substrate and the resistance of the touch lead are measured after the winding design of the touch leads is performed. In Example A of the present disclosure, the touch lead with the structure designed in the present disclosure is used as the touch lead, and the bezel size of the touch substrate and the resistance of the touch lead are measured after the winding design of part of the touch leads is performed. In both Example B of the present disclosure and Example C of the present disclosure, the resistance values are adjusted according to the bezel size by using the structure designed in the present disclosure as the touch lead.

In some embodiments, as shown in FIG. 5, the bonding region B is located in the third side peripheral region Sc.

For example, in a case where the bonding region B is located in the third side peripheral region Sc, an extending direction of the touch sensing line Rx is a direction from the third side peripheral region Sc to the first side peripheral region Sa. An end of the touch sensing line Rx proximate to the first side peripheral region Sa is farthest from the bonding region B, so that a length of a touch lead connected to the end of the touch sensing line Rx proximate to the first side peripheral region Sa is longest, and this type of touch lead may be disposed in the first wiring region S1 with a double-layer wiring structure, i.e., may be the first-type touch lead L1.

It will be noted that the position of the bonding region B is exemplarily shown, and is not a limitation on the position thereof.

In some embodiments, as shown in FIGS. 7, 8, 10, 12, 16, 18, 20 to 22, each of at least one side of each wiring region in an extending direction of the touch lead therein is provided with a shielding region Sr. The shielding region Sr includes at least one shielding line 41 and at least one grounding line 42. Each shielding line 41 includes a first wiring 11*a* and a second wiring 12*a* connected to each other, and orthographic projections of the first wiring 11*a* and the second wiring 12*a* of the shielding line 41 on the touch substrate 10 are overlapped. Each grounding line 42 includes a first wiring 11*a* and a second wiring 12*a* connected to each other, and orthographic projections of the first wiring 11*a* and the second wiring 12*a* of the grounding line 42 on the touch substrate 10 are overlapped. Each wiring region includes any one of the first wiring region S1, the first wiring sub-region S21, the third wiring region S3, and the second wiring sub-region S22.

It will be noted that, in a plan view, since a dimension of the shielding region Sr in the direction Z from the peripheral region S to the touch region A is small, the shielding region Sr is not indicated by boxing a region, and the position of the shielding region Sr is indicated by only an arrow. It will be understood that a border of each type of wiring region is provided with a shielding region Sr.

In some examples, as shown in FIG. 12, except the wiring region located on an innermost side of the peripheral region S, two sides of each wiring region in the extending direction of the touch lead therein are each provided with a shielding region Sr. Each shielding region Sr, located between two wiring regions, includes two shielding lines 41 and a grounding line 42, and the two shielding lines 41 are respectively disposed on two sides of the grounding line 42. A shielding region Sr, which is disposed on a side, away from the touch region A, of the first wiring region S1 located on an outermost side of the peripheral region S, includes a shielding line 41 and a grounding line 42, and the grounding line 42 is located on a side of the shielding line 41 away from the touch region A.

The shielding line 41 and the grounding line 42 each have a double-layer wiring structure, which may specifically refer to the structure of the first-type touch lead L1, and will not be repeated here. The shielding line 41 may avoid signal interference between two adjacent wiring regions, and the grounding line 42 is used for grounding.

In some embodiments, as shown in FIGS. 7, 8, 10, 12, 16 and 18, the touch substrate 10 further includes a substrate 1, a first insulating layer 3 (the same as the above insulating layer 3) and a second insulating layer 4. The first layer wiring group 11 is disposed on a side of the substrate 1. The first insulating layer 3 is disposed on a side of the first layer wiring group 11 away from the substrate 1. The second layer wiring group 12 is disposed on a side of the first insulating layer 3 away from the substrate 1. The second insulating layer 4 is disposed on a side of the second layer wiring group 12 away from the substrate 1.

For example, the substrate 1 may be a flexible substrate. In this case, the flexible substrate may be, for example, a polyethylene terephthalate (PET) substrate, a polyethylene naphthalate two formic acid glycol ester (PEN) substrate or a polyimide (PI) substrate.

In some other examples, the substrate 1 may be a rigid substrate. In this case, the rigid substrate may be, for example, a glass substrate.

It will be noted that the orthographic projections of the first wiring 11*a* and the second wiring 12*a* on the touch substrate 10 are overlapped, which will be understood that orthographic projections of the first wiring 11*a* and the second wiring 12*a* on the substrate 1 are overlapped.

In some embodiments, as shown in FIG. 5, the peripheral region S located on the at least one side of the touch region A is provided with the bonding region(s) B therein. The touch substrate 10 further includes a plurality of first electrode lines A11 extending in the first direction X and a plurality of second electrode lines A12 extending in the second direction Y. The first direction X and the second direction Y intersect. The touch substrate 10 further includes at least one flexible printed circuit 20. An end of each of the at least one flexible printed circuit 20 is disposed in the bonding region B. An end of the touch lead is connected to an end of a first electrode line A11 or a second electrode line A12, and another end of the touch lead is connected to the flexible printed circuit 20.

For example, referring to FIG. 5 again, the first electrode line A11 is the touch driving line Tx, and the second electrode line A12 is the touch sensing line Rx. The bonding region B may be disposed in the third side peripheral region Sc. The touch substrate 10 may be provided with three flexible printed circuits 20. An end of the flexible printed circuit 20 is disposed in the bonding region B, and the flexible printed circuit 20 is used for connecting the touch leads to the driving IC, details are as described above, and will not be repeated here.

Here, a magnitude of an included angle between the first direction X and the second direction Y may be set according to actual needs. For example, the first direction X and the second direction Y may be perpendicular to each other. That is, the included angle between the first direction X and the second direction Y is 90°.

Figure 23:
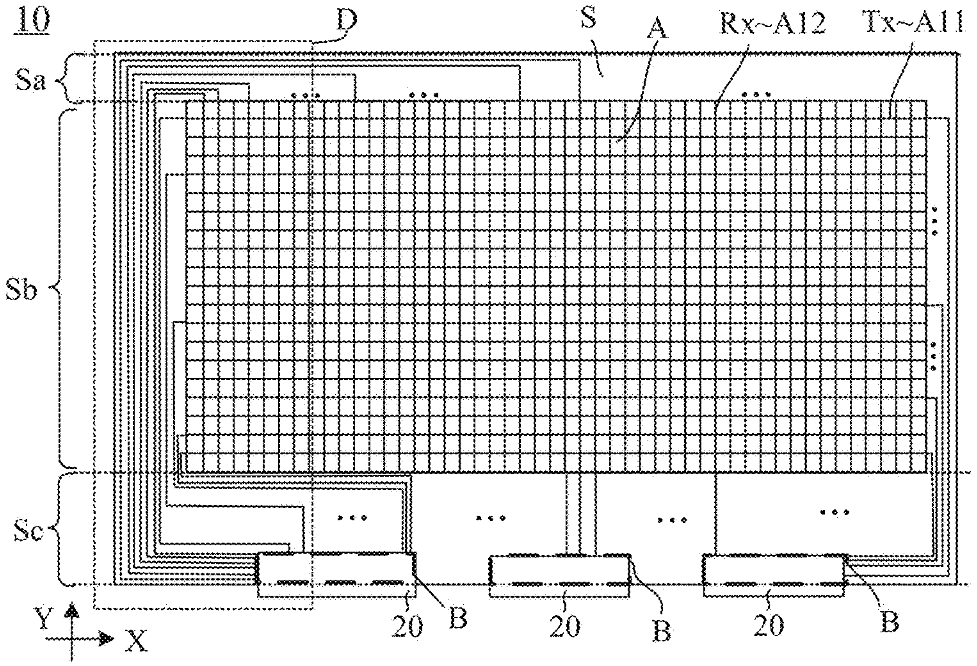
FIG. 23 is a structural diagram of another touch substrate, in accordance with some embodiments of the present disclosure.

In some embodiments, as shown in FIG. 23, two ends of the first electrode line A11 are each connected to a touch lead, and two ends of the second electrode line A12 are each connected to a touch lead.

For example, an end of each first electrode line A11 is connected to a flexible printed circuit 20 at a bonding region B through a touch lead, and another end of the first electrode line A11 is connected to a flexible printed circuit 20 at a bonding region B through another touch lead. An end of the second electrode line A12 is connected to a flexible printed circuit 20 at a bonding region B through a touch lead, and another end of the second electrode line A12 is connected to a flexible printed circuit 20 at a bonding region B through another touch lead.

Figure 24:
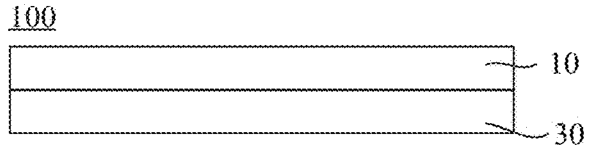
FIG. 24 is a structural diagram of a touch panel, in accordance with some embodiments of the present disclosure.

Some embodiments of the present disclosure further provide a touch panel 100. As shown in FIG. 24, the touch panel 100 includes the above touch substrate 10, and the touch panel 100 further includes a display panel 30 stacked on the touch substrate 10.

For example, the display panel 30 includes an array substrate and light-emitting devices arranged in an array. The array substrate includes thin film transistors (TFT) arranged in an array. For example, the array substrate includes a substrate, and an active layer, a gate insulating layer, a gate metal layer, an interlayer insulating layer, a source-drain metal layer and a planarization layer that are sequentially stacked on the substrate. The light-emitting devices arranged in the array are disposed on a side of the planarization layer away from the substrate.

Beneficial effects of the touch panel are the same as the beneficial effects of the touch substrate 10 provided in the first aspect of the present disclosure, and will not be repeated here.

Figure 25:
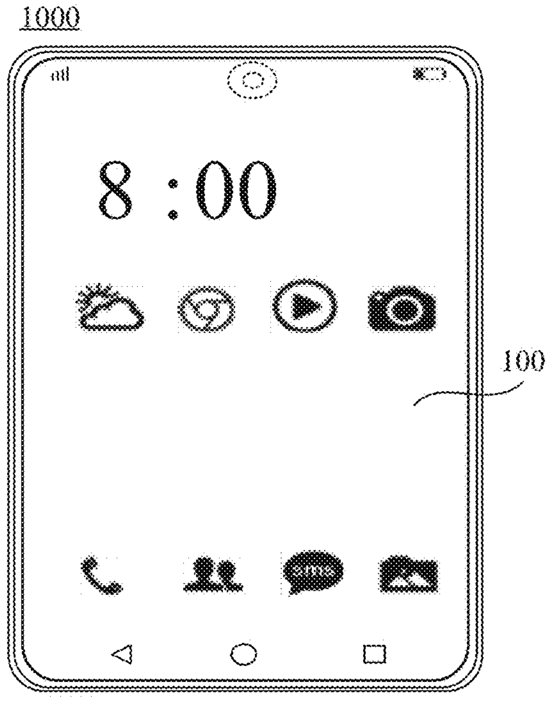
FIG. 25 is a structural diagram of a touch display device, in accordance with some embodiments of the present disclosure.

Some embodiments of the present disclosure further provide a touch display device 1000. As shown in FIG. 25, the touch display device 1000 includes the above touch panel 100.

For example, the touch display device 1000 may be any product or component with a display function, such as a mobile phone, a tablet computer, a television, a display, a notebook computer, a digital photo frame, or a navigator.

The foregoing descriptions are merely some specific implementation manners of the present disclosure, but the protection scope of the present disclosure is not limited thereto. Changes or replacements that any person skilled in the art could conceive of within the technical scope of the present disclosure shall all be included in the protection scope of the present disclosure. Therefore, the protection scope of the present disclosure shall be subject to the protection scope of the claims.

What is claimed is:

1. A touch substrate, having a touch region and a peripheral region located on at least one side of the touch region; wherein the touch substrate comprises: a first layer wiring group and a second layer wiring group that are located in the peripheral region, and a first insulating layer disposed between the first layer wiring group and the second layer wiring group; the first layer wiring group includes a plurality of first wirings, and the second layer wiring group includes a plurality of second wirings; wherein the peripheral region includes a first wiring region and a second wiring region, and at least a portion of the first wiring region is farther from the touch region than the second wiring region;

the first wiring region is provided with at least one first-type touch lead therein, each first-type touch lead includes a first wiring in the plurality of first wirings and a second wiring in the plurality of second wirings that are connected to each other, orthographic projections of the first wiring and the second wiring of the first-type touch lead on the touch substrate are overlapped, and the first wiring and the second wiring of the first-type touch lead are connected through vias penetrating the first insulating layer; the second wiring region is provided with at least one second-type touch lead therein, and any second-type touch lead includes a second wiring in the plurality of second wirings or a first wiring in the plurality of first wirings; and a length of the first-type touch lead is greater than a length of the second-type touch lead.

2. The touch substrate according to claim 1, wherein a resistance of the first-type touch lead is substantially equal to a resistance of the second-type touch lead.

3. The touch substrate according to claim 1, wherein the second wiring region includes a first wiring sub-region and a second wiring sub-region; a second-type touch lead in the at least one second-type touch lead disposed in the first wiring sub-region includes a second wiring in the plurality of second wirings, and a second-type touch lead in the at least one second-type touch lead disposed in the second wiring sub-region includes a first wiring in the plurality of first wirings; a square resistance of each first wiring is greater than a square resistance of each second wiring;

at least a portion of the first wiring sub-region is farther from the touch region than the second wiring sub-region; and a length of the second-type touch lead in the first wiring sub-region is greater than a length of the second-type touch lead in the second wiring sub-region.

4. The touch substrate according to claim 3, wherein the peripheral region further includes a third wiring region; at least a portion of the third wiring region is closer to the touch region than the first wiring sub-region, and is farther from the touch region than the second wiring sub-region;

the third wiring region is provided with at least one third-type touch lead therein, and each third-type touch lead includes a first segment and a second segment connected to each other in an extending direction of the third-type touch lead; the first segment includes a first wiring in the plurality of first wirings, and the second segment includes a second wiring in the plurality of second wirings; adjacent ends of the first wiring and the second wiring of the third-type touch lead are connected through a via; and a length of the third-type touch lead is greater than the length of the second-type touch lead in the second wiring sub-region, and is less than the length of the second-type touch lead in the first wiring sub-region.

5. The touch substrate according to claim 4, wherein a resistance of the third-type touch lead is substantially equal to a resistance of the first-type touch lead, and is substantially equal to a resistance of the second-type touch lead.

6. The touch substrate according to claim 4, wherein for each type of touch leads among first-type touch leads included in the at least one first-type touch lead, second-type touch leads included in the at least one second-type touch lead, and third-type touch leads included in the at least one third-type touch lead, each type of touch leads includes a plurality of touch leads arranged in a direction from the peripheral region to the touch region, and lengths of the plurality of touch leads are reduced in the direction from the peripheral region to the touch region.

7. The touch substrate according to claim 6, wherein the peripheral region includes at least one bonding region, and the at least one first-type touch lead, the at least one second-type touch lead and the at least one third-type touch lead are gathered to the at least one bonding region.

8. The touch substrate according to claim 7, wherein the at least one bonding region includes a plurality of bonding regions, and a number of touch leads gathered to each bonding region of the plurality of bonding regions may be equal or may not be equal.

9. The touch substrate according to claim 7, wherein a distance between every two adjacent touch leads in the plurality of touch leads of each type of touch leads is in a range of 3 μm to 5 μm, inclusive.

10. The touch substrate according to claim 4, wherein the peripheral region is located on three sides of the touch region, and is divided into a first side peripheral region, a second side peripheral region and a third side peripheral region; the first wiring region includes a first region, a second region and a third region connected in sequence; the first region is located in the first side peripheral region, the second region is located in the second side peripheral region, and the third region is located in the third side peripheral region;

the first-type touch lead includes a first extending segment, a second extending segment and a third extending segment connected in sequence; the first extending segment is located in the first region, the second extending segment is located in the second region, and the third extending segment is located in the third region; wherein a wiring width of the first extending segment is greater than a wiring width of the second extending segment, and the wiring width of the second extending segment is greater than a wiring width of the third extending segment.

11. The touch substrate according to claim 10, wherein the at least one first-type touch lead includes a plurality of first-type touch leads; and in the second region, wiring widths of second extending segments of the plurality of first-type touch leads are reduced in a direction from the second region to the touch region.

12. The touch substrate according to claim 10, wherein the at least one first-type touch lead includes a plurality of first-type touch leads; and in the second region, wiring widths of second extending segments of the plurality of first-type touch leads are reduced in a direction from the second region to the touch region; and the at least one bonding region is located in the third side peripheral region.

13. The touch substrate according to claim 4, wherein for each wiring region among the first wiring region, the first wiring sub-region, the third wiring region and the second wiring sub-region, at least one side of each wiring region in an extending direction of a touch lead in the wiring region is provided with a shielding region;

the shielding region includes at least one shielding line and at least one grounding line; each shielding line includes a first wiring in the plurality of first wirings and a second wiring in the plurality of second wirings that are connected to each other, and orthographic projections of the first wiring and the second wiring of the shielding line on the touch substrate are overlapped; each grounding line includes a first wiring in the plurality of first wirings and a second wiring in the plurality of second wirings that are connected to each other, and orthographic projections of the first wiring and the second wiring of the grounding line on the touch substrate are overlapped.

14. The touch substrate according to claim 4, wherein the peripheral region is located on three sides of the touch region, and is divided into a first side peripheral region, a second side peripheral region and a third side peripheral region;

the first wiring region extends sequentially along the first side peripheral region, the second side peripheral region and the third side peripheral region;

the first wiring sub-region extends sequentially along the second side peripheral region and the third side peripheral region; and the third wiring region extends sequentially along the second side peripheral region and the third side peripheral region.

15. The touch substrate according to claim 4, wherein the peripheral region is located on three sides of the touch region, and is divided into a first side peripheral region, a second side peripheral region and a third side peripheral region;

the first wiring region extends sequentially along the first side peripheral region, the second side peripheral region and the third side peripheral region;

the third wiring region extends sequentially along the second side peripheral region and the third side peripheral region; and the second wiring sub-region extends sequentially along the second side peripheral region and the third side peripheral region.

16. The touch substrate according to claim 1, further comprising:

a substrate; the first layer wiring group being disposed on a side of the substrate; and a second insulating layer disposed on a side of the second layer wiring group away from the substrate.

17. The touch substrate according to claim 1, wherein the peripheral region located on the at least one side of the touch region is provided with a bonding region;

the touch substrate further comprises:

a plurality of first electrode lines extending in a first direction and a plurality of second electrode lines extending in a second direction that are all located in the touch region; wherein the first direction and the second direction intersect; and at least one flexible printed circuit; the at least one flexible printed circuit each having an end disposed in the bonding region; wherein an end of a touch lead is connected to an end of a first electrode line or a second electrode line, and another end of the touch lead is connected to a flexible printed circuit; the touch lead is the first-type touch lead or the second-type touch lead.

18. The touch substrate according to claim 17, wherein two ends of the first electrode line are each connected to a touch lead; and two ends of the second electrode line are each connected to a touch lead.

19. A touch panel, comprising:

the touch substrate according to claim 1; and a display panel stacked on the touch substrate.

20. A touch display device comprising the touch panel according to claim 19.

* * * * *